(12) United States Patent
Ishidate et al.

(10) Patent No.: US 10,303,081 B2
(45) Date of Patent: May 28, 2019

(54) CASING OF A LIGHT SCANNING APPARATUS, LIGHT SCANNING APPARATUS, AND IMAGE FORMING APPARATUS

(71) Applicant: CANON KABUSHIKI KAISHA, Tokyo (JP)

(72) Inventors: Takehiro Ishidate, Tokyo (JP); Yasuaki Otoguro, Abiko (JP); Yuichiro Imai, Tokyo (JP); Daisuke Aruga, Abiko (JP); Yuta Okada, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/889,052

(22) Filed: Feb. 5, 2018

(65) Prior Publication Data
US 2018/0231913 A1    Aug. 16, 2018

(30) Foreign Application Priority Data
Feb. 15, 2017 (JP) ................................. 2017-025994

(51) Int. Cl.
*G02B 26/12* (2006.01)
*G03G 15/04* (2006.01)
(Continued)

(52) U.S. Cl.
CPC ....... *G03G 15/0435* (2013.01); *G02B 26/121* (2013.01); *G02B 26/125* (2013.01); *G03G 15/04036* (2013.01); *G03G 21/1666* (2013.01)

(58) Field of Classification Search
CPC ......... G03G 15/0435; G03G 15/04036; G02B 26/121; G02B 26/125
See application file for complete search history.

(56) References Cited

U.S. PATENT DOCUMENTS 7,072,087 B2    7/2006 Nakahata ................... 359/204.1
7,298,390 B2   11/2007 Nakahata ..................... 347/231
(Continued)

FOREIGN PATENT DOCUMENTS

JP    2013-054082    3/2013

OTHER PUBLICATIONS

Machine translation of JP 2013-054082. Mar. 21, 2013.*
(Continued)

*Primary Examiner* — Carla J Therrien
(74) *Attorney, Agent, or Firm* — Venable LLP

(57) ABSTRACT

Provided is a casing of a light scanning apparatus accommodating a rotary polygon mirror and an optical member, the casing including: first seat surfaces arranged on a bottom surface of the casing to mount a first deflection portion that includes a first rotary polygon mirror, a first motor, and a first board on which the first rotary polygon mirror and the first motor are fixed; and second seat surfaces arranged on the bottom surface to mount a second deflection portion that includes a second rotary polygon mirror, a second motor having a maximum number of revolutions higher than that of the first motor, a second board on which the second rotary polygon mirror and the second motor are fixed, and a mounting portion supporting the second board, wherein at least one of the second seat surfaces is arranged outside of a region formed by connecting the first seat surfaces.

10 Claims, 23 Drawing Sheets

(51) Int. Cl.
*G03G 21/16* (2006.01)
*G03G 15/043* (2006.01)

(56) References Cited

U.S. PATENT DOCUMENTS

| | | | |
|---|---|---|---|
| 7,522,326 B1 | 4/2009 | Otoguro | 347/256 |
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2008/0259424 A1* | 10/2008 | Itami | F16C 17/026 |
| | | | 359/200.1 |
| 2009/0244670 A1 | 10/2009 | Sato et al. | 359/205.1 |
| 2011/0128342 A1* | 6/2011 | Ishidate | B41J 2/471 |
| | | | 347/224 |
| 2012/0081770 A1 | 4/2012 | Sato et al. | 359/204.1 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/702,219, filed Sep. 12, 2017.
U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/891,080, filed Feb. 7, 2018.
U.S. Appl. No. 15/908,482, filed Feb. 28, 2018.
U.S. Appl. No. 15/718,510, filed Sep. 28, 2017.

* cited by examiner

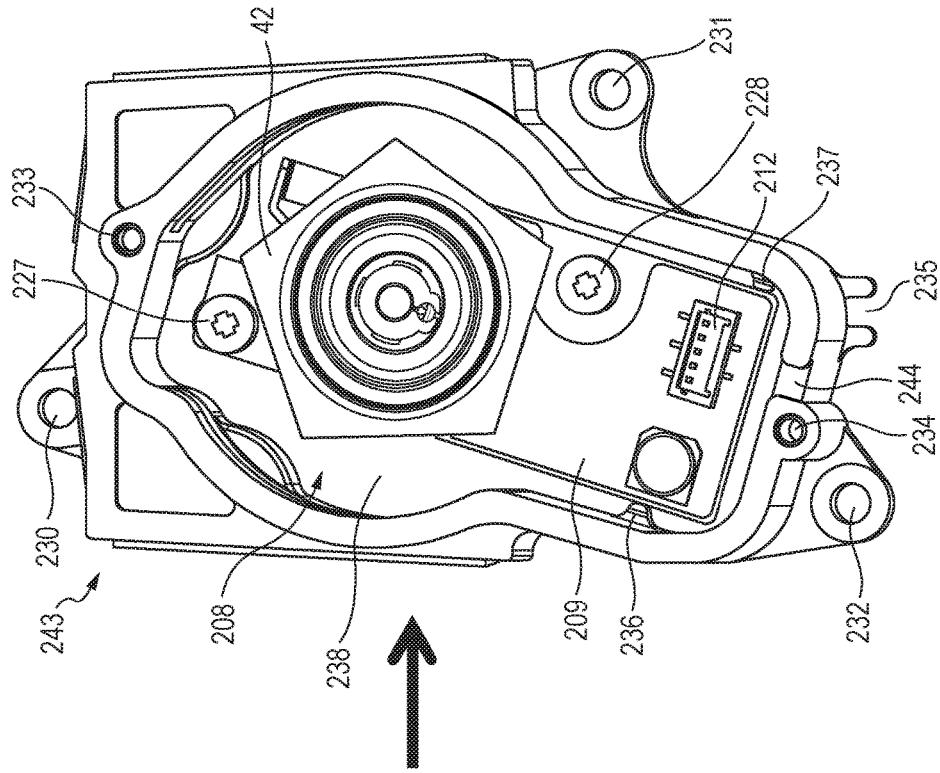
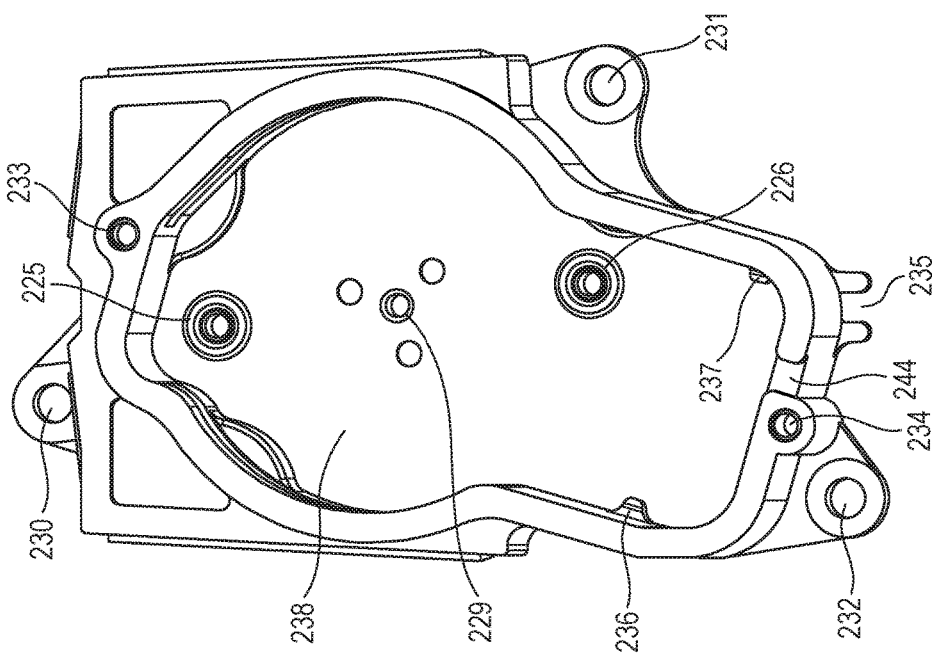
FIG. 8A
FIG. 8B

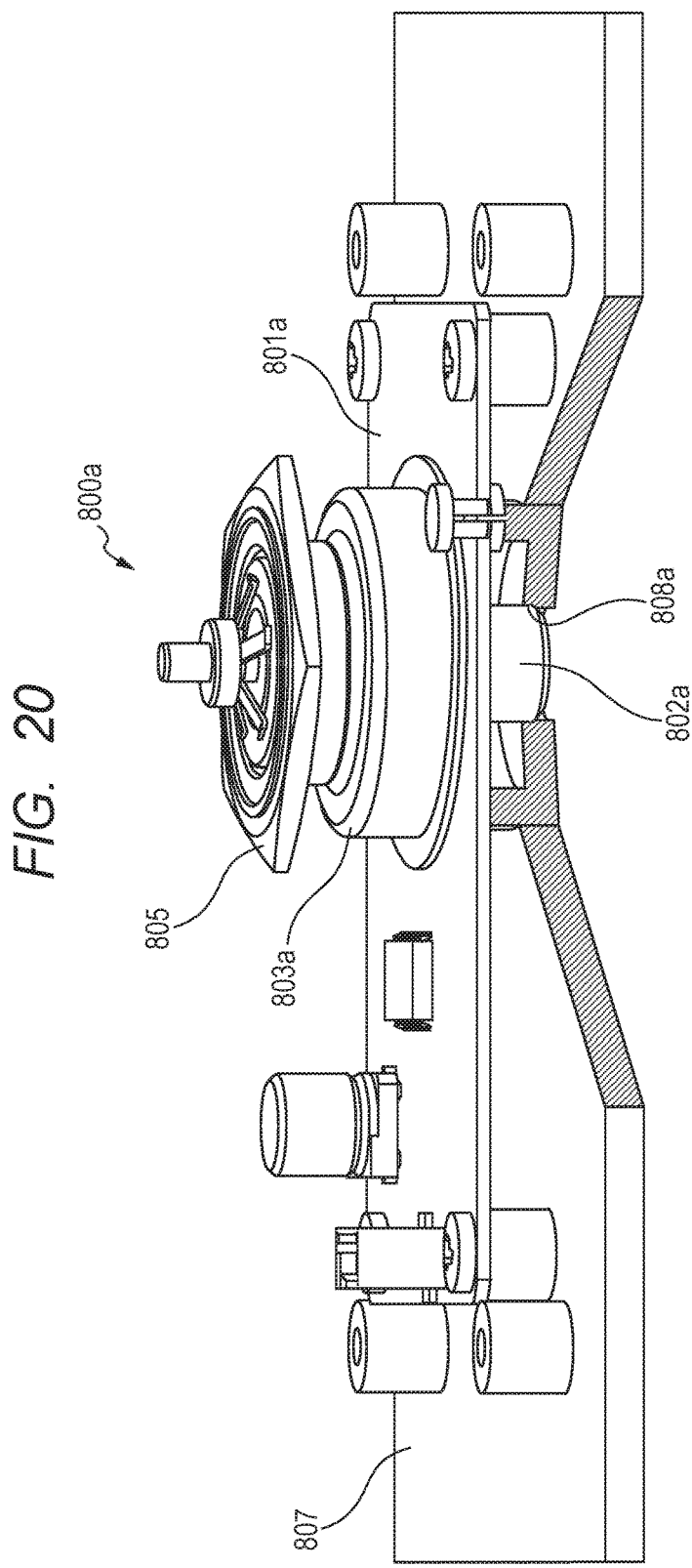

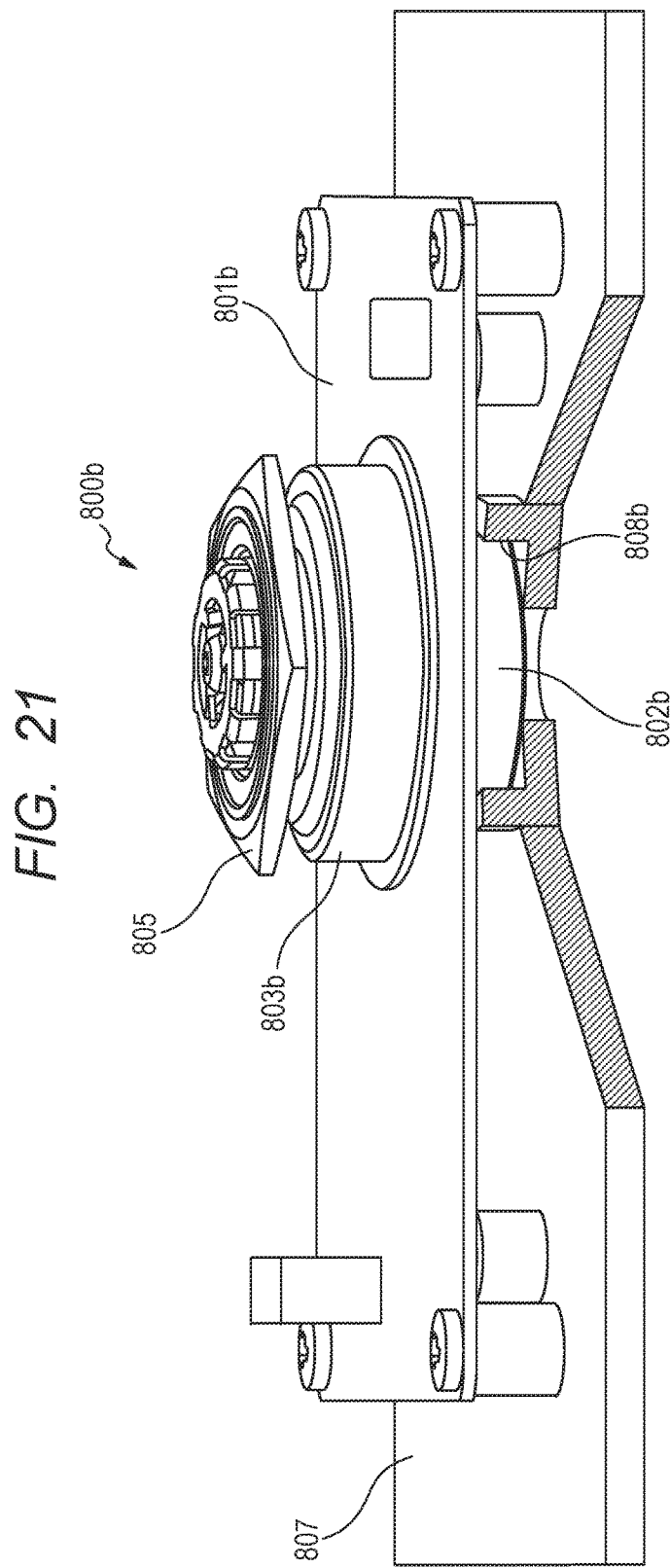

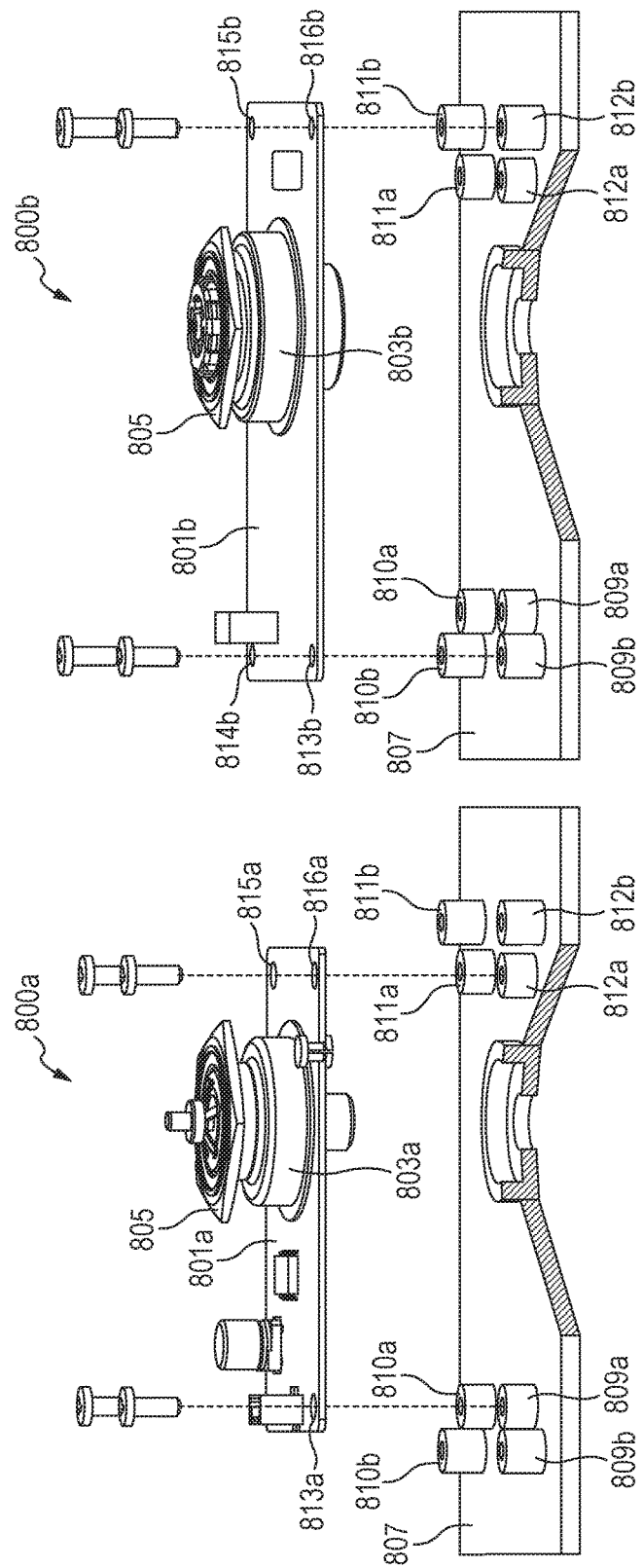

CASING OF A LIGHT SCANNING APPARATUS, LIGHT SCANNING APPARATUS, AND IMAGE FORMING APPARATUS

BACKGROUND OF THE INVENTION

Field of the Invention

The present invention relates to a casing of a light scanning apparatus included in a digital copying machine, a laser beam printer, a facsimile machine, or other electrophotographic image forming apparatus, and to a light scanning apparatus and an image forming apparatus.

Description of the Related Art

Hitherto, a light scanning apparatus used in an electrophotographic image forming apparatus forms light spots on a surface to be scanned by deflecting a light beam emitted from a light source with a deflection device which includes a rotary polygon mirror and converging the light beam toward the surface to be scanned with an imaging optical system. The light scanning apparatus scans the surface to be scanned with the formed light spots to form a latent image on the surface to be scanned. The deflection device and the imaging optical system including lenses and reflective mirrors are mounted inside a predetermined casing (hereinafter referred to as "optical box") of the light scanning apparatus. In the light scanning apparatus, a rotary shaft of a motor configured to rotate the rotary polygon mirror may be inclined (hereinafter referred to as "shaft inclination") with respect to a design rotary-shaft mounting angle depending on a manufacturing accuracy. When the shaft inclination of the rotary polygon mirror occurs, the position and the angle at which the light beam deflected by the deflection device enters the lens of the imaging optical system are equally deviated from the design values. Therefore, light beam spots each having an irregular shape are formed on the surface to be scanned, leading to reduction in imaging performance and deterioration in image quality.

FIG. 19A and FIG. 19B are illustrations of an example of a configuration of a deflection device of a comparative example. In FIG. 19A and FIG. 19B, an angle of a rotary shaft 804 with respect to a drive board 801 varies depending on a manufacturing accuracy and a caulking accuracy of a member for mounting a bearing 802 to the drive board 801. When the drive board 801 warps, the rotary shaft 804 having a rotary polygon mirror 805 mounted thereon is similarly inclined to cause shaft inclination. In this manner, reflective surfaces of the rotary polygon mirror 805 are equally inclined, and a reflection angle in a sub-scanning direction of reflected light is deviated from an ideal position, resulting in reduction in optical characteristics. Further, it is difficult to process mounting seat surfaces 809, 810, 811, and 812 for the drive board 801, which are formed on an optical box 807, to have ideal flat surfaces in a strict sense. Therefore, the deviation from the ideal flat surfaces also appears as the shaft inclination of the rotary polygon mirror 805.

In the light scanning apparatus, as an item that influences the productivity of the image forming apparatus (speed to output images in a predetermined time period), there may be given the number of revolutions of the motor configured to drive the rotary polygon mirror in addition to the number of light sources and the number of surfaces of the rotary polygon mirror. Therefore, there has been a demand for increase in number of revolutions of the motor in order to increase the productivity of the image forming apparatus. Along therewith, there are problems of motor durability, and noise and vibration caused by the motor. Therefore, for example, in Japanese Patent Application Laid-Open No. 2013-54082, the following light scanning apparatus has been proposed. That is, dedicated deflection devices that differ in durability or rotation control method depending on the number of revolutions of the motor are prepared, and the dedicated deflection devices are allowed to be mounted to a common optical box.

When deflection devices including motors having different numbers of revolutions are allowed to be mounted to a common optical box, the following three problems arise. Description below is made assuming that a common optical system, that is, the common rotary polygon mirror 805 is used to use the common optical box. The first problem resides in a difference in shaft diameter of a bearing due to a difference in bearing structure of the motor. For example, magnitude relationships of a bearing diameter and a bearing length between motors 803a and 803b are shown in FIG. 20 and FIG. 21. In this case, a hole diameter of a positioning hole 808 of the optical box 807 has a step difference as illustrated in FIG. 20 and FIG. 21. In this manner, the motors 803a and 803b having different shaft diameters can be mounted to the common optical box 807. When the abovementioned magnitude relationships are not satisfied, the optical box 807 cannot be shared.

Next, the second problem resides in a difference in height from a back surface of the drive board to the rotary polygon mirror 805 (hereinafter referred to as "mirror height"). When there is a difference in mirror height due to a difference in motor structure or other reasons, the mirror heights are required to be set to the same height in order to allow usage of the two motors in the common optical box. The motors 803a and 803b have different mirror heights 817a and 817b as illustrated in FIG. 22A and FIG. 22B, respectively, and a magnitude relationship between the mirror heights 817a and 817b satisfies 817a>817b. In this case, in order to set the heights from the optical box 807 to the rotary polygon mirror 805 to the same height, heights of respective bosses 809a to 812a and 809b to 812b formed on the optical box 807 are required to satisfy a relationship represented by the following expression.

$$809a=810a=811a=812a<809b=810b=811b=812b$$

The third problem resides in differences in size of the drive board and screw hole position. When the area of the drive board differs depending on a difference in scale of the drive circuit due to the difference in number of revolutions of the motor, the motors also have a difference in screw hole position in accordance therewith. In this case, in order to allow usage of the two motors in the common optical box 807, as illustrated in FIG. 22A, FIG. 22B, FIG. 23A, and FIG. 23B, the size of the drive board is required to satisfy the following magnitude relationship. That is, the sizes of drive substrates of a drive board 801a for the motor 803a and a drive board 801b for the motor 803b are required to satisfy a magnitude relationship represented by the following expression.

$$801a<801b$$

When the above-mentioned magnitude relationships, which are determined based on the mirror height 817 and the size of the drive board 801, are not satisfied, the optical box 807 cannot be shared. Details of FIG. 19A and FIG. 19B to FIG. 22A and FIG. 22B are described later.

The problems that may arise when the deflection devices including motors having different numbers of revolutions are allowed to be mounted to the common optical box have been described above. It is also conceivable to prepare different optical boxes depending on the motors having different specifications. However, in terms of reduction in cost and type of the optical box, a great advantage can be obtained when usage of a common optical box is allowed. In Japanese Patent Application Laid-Open No. 2013-54082, positioning to a common optical box is allowed by changing presence or absence of a connection plate. In this method, however, the connection plate is interposed between the optical box and the motor, and hence an unintended stress may be applied to the back surface of the drive board due to warpage of the connection plate or a difference in thickness of the connection plate. That is, this method affects a posture of the motor, in particular, the shaft inclination accuracy. The shaft inclination of the motor causes reduction in performance of imaging on the surface to be scanned, which directly leads to deterioration in image quality. Therefore, the connection plate is shaped to be deformable by forming a cutout in a coupling portion of the connection plate, but the thickness of the connection plate may be increased depending on the difference in mirror height of the rotary polygon mirror between the deflection devices having different specifications. In this case, even when the connection plate is shaped to be deformable with the cutout, the bending rigidity of the connection plate is increased. Thus, the stress to be applied to the back surface of the drive board cannot be reduced, and the factor that causes reduction in shaft inclination accuracy cannot be eliminated.

SUMMARY OF THE INVENTION

The present invention has been made under the above-mentioned circumstances, and has an object to position deflection devices having different specifications in a common optical box without reducing a shaft inclination accuracy.

In order to solve the above-mentioned problems, according to embodiments of the present invention, the following structures are provided.

(1) According to one embodiment of the present invention, there is provided casing of a light scanning apparatus, the casing accommodating a rotary polygon mirror having a plurality of reflective surfaces and configured to deflect a light beam emitted from a light source, and an optical member including an imaging lens configured to image the light beam deflected by the rotary polygon mirror on a photosensitive member and a reflective mirror configured to guide the light beam deflected by the rotary polygon mirror to the photosensitive member, the casing including: a plurality of first seat surfaces arranged on a bottom surface of the casing to mount a first deflection portion to the casing, the first deflection portion including a first rotary polygon mirror, a first motor configured to drive the first rotary polygon mirror, and a first board on which the first rotary polygon mirror and the first motor are fixed; and a plurality of second seat surfaces arranged on the bottom surface of the casing to mount a second deflection portion to the casing, the second deflection portion including a second rotary polygon mirror, a second motor configured to drive the second rotary polygon mirror and having a maximum number of revolutions that is higher than a maximum number of revolutions of the first motor, a second board on which the second rotary polygon mirror and the second motor are fixed, and a mounting portion configured to support the second board, wherein at least one of the plurality of second seat surfaces is arranged outside of a region formed by connecting the plurality of first seat surfaces to each other.

(2) According to one embodiment of the present invention, there is provided a light scanning apparatus, including a casing accommodating a rotary polygon mirror having a plurality of reflective surfaces and configured to deflect a light beam emitted from a light source, and an optical member including an imaging lens configured to image the light beam deflected by the rotary polygon mirror on a photosensitive member and a reflective mirror configured to guide the light beam deflected by the rotary polygon mirror to the photosensitive member, the casing including: a plurality of first seat surfaces arranged on a bottom surface of the casing to mount a first deflection portion to the casing, the first deflection portion including a first rotary polygon mirror, a first motor configured to drive the first rotary polygon mirror, and a first board on which the first rotary polygon mirror and the first motor are fixed; and a plurality of second seat surfaces arranged on the bottom surface of the casing to mount a second deflection portion to the casing, the second deflection portion including a second rotary polygon mirror, a second motor configured to drive the second rotary polygon mirror and having a maximum number of revolutions that is higher than a maximum number of revolutions of the first motor, a second board on which the second rotary polygon mirror and the second motor are fixed, and a mounting portion configured to support the second board, wherein at least one of the plurality of second seat surfaces is arranged outside of a region formed by connecting the plurality of first seat surfaces to each other.

(3) According to one embodiment of the present invention, there is provided an image forming apparatus, including: an image forming unit configured to form an image on a recording material; and a light scanning apparatus including a casing accommodating a rotary polygon mirror having a plurality of reflective surfaces and configured to deflect a light beam emitted from a light source, and an optical member including an imaging lens configured to image the light beam deflected by the rotary polygon mirror on a photosensitive member and a reflective mirror configured to guide the light beam deflected by the rotary polygon mirror to the photosensitive member, the casing including: a plurality of first seat surfaces arranged on a bottom surface of the casing to mount a first deflection portion to the casing, the first deflection portion including a first rotary polygon mirror, a first motor configured to drive the first rotary polygon mirror, and a first board on which the first rotary polygon mirror and the first motor are fixed; and a plurality of second seat surfaces arranged on the bottom surface of the casing to mount a second deflection portion to the casing, the second deflection portion including a second rotary polygon mirror, a second motor configured to drive the second rotary polygon mirror and having a maximum number of revolutions that is higher than a maximum number of revolutions of the first motor, a second board on which the second rotary polygon mirror and the second motor are fixed, and a mounting portion configured to support the second board, wherein at least one of the plurality of second seat surfaces is arranged outside of a region formed by connecting the plurality of first seat surfaces to each other.

According to the present invention, deflection devices having different specifications can be positioned in a common optical box without reducing a shaft inclination accuracy.

Further features of the present invention will become apparent from the following description of exemplary embodiments with reference to the attached drawings.

BRIEF DESCRIPTION OF THE DRAWINGS

FIG. 8A is a perspective view for illustrating a mounting portion in the first embodiment.

FIG. 8B is a perspective view for illustrating a high-speed deflection unit in the first embodiment.

FIG. 20 is a perspective view for illustrating a state in which a deflection device is mounted to the optical box of the comparative example.

FIG. 21 is a perspective view for illustrating a state in which a deflection device is mounted to the optical box of the comparative example.

FIG. 23A is a perspective view for illustrating a state in which the deflection device is mounted to the optical box of the comparative example.

FIG. 23B is a perspective view for illustrating a state in which the deflection device is mounted to the optical box of the comparative example.

DESCRIPTION OF THE EMBODIMENTS

Now, details of embodiments of the present invention are described with reference to the drawings.

[Configuration of Image Forming Apparatus]

Figure 19A:
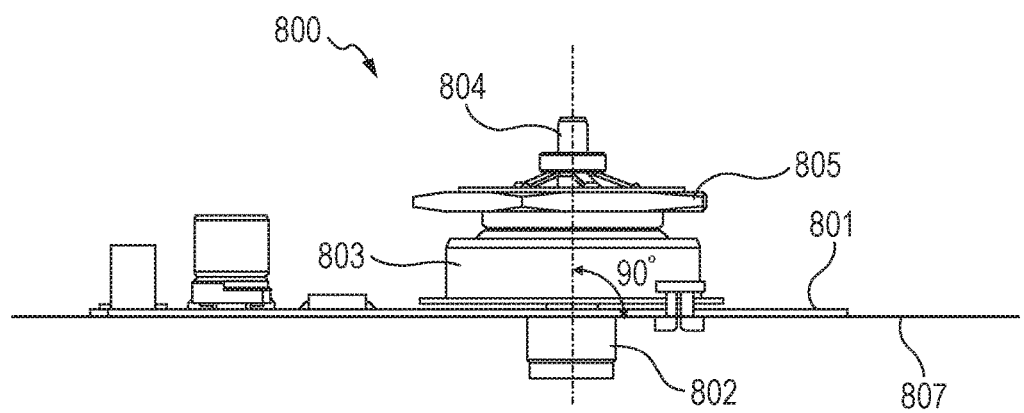
FIG. 19A illustrates a configuration of a deflection device and configurations of mounting seat surfaces of an optical box of a comparative example.
Figure 19B:
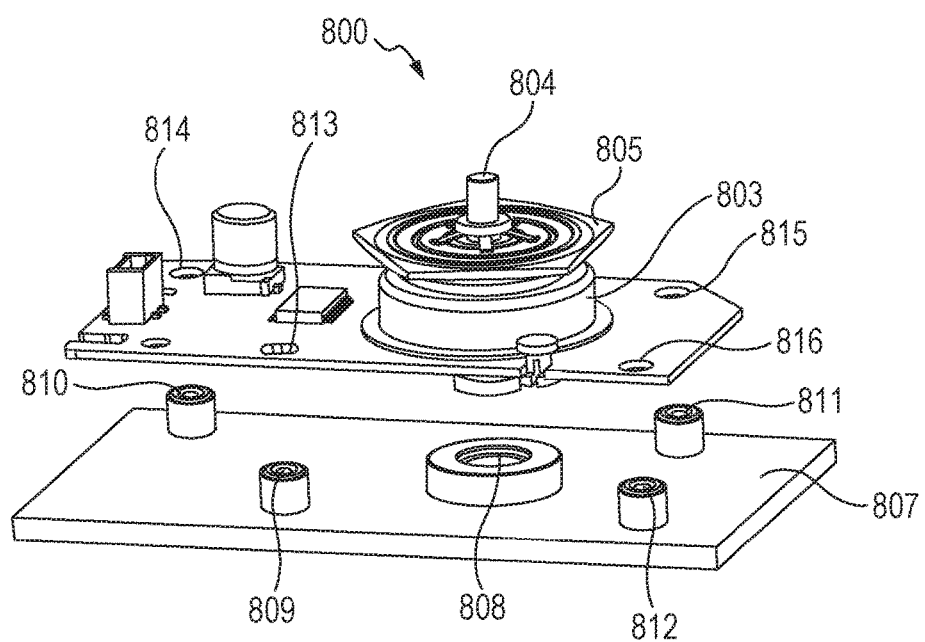
FIG. 19B illustrates the configuration of the deflection device and the configurations of the mounting seat surfaces of the optical box of the comparative example.

First, for comparison with the embodiments, a configuration of a deflection device of a comparative example is described with reference to the drawings. FIG. 19A and FIG. 19B are illustrations of an example of the configuration of the deflection device of the comparative example. FIG. 19A is a side view for illustrating an outer appearance of a deflection device 800. FIG. 19B is a perspective view for illustrating the deflection device 800 and a region around an optical box 807 to which the deflection device 800 is mounted.

In the deflection device 800 illustrated in FIG. 19A, a motor 803 configured to drive a rotary polygon mirror 805 includes a bearing 802. The bearing 802 of the motor 803 is fitted to a hole portion formed in a drive board 801 having mounted thereon a drive circuit for driving the motor 803. In this manner, the motor 803 is mounted to the drive board 801. Further, the bearing 802 of the motor 803 is inserted and fitted to a positioning hole 808 formed in the optical box 807 of the light scanning apparatus. In this manner, the motor 803 is positioned with respect to the optical box 807 serving as a casing of the light scanning apparatus. The bearing 802 receives a shaft of a rotor portion of the motor 803, and the rotary polygon mirror 805 is mounted to a rotary shaft 804 of the rotor portion. The rotary polygon mirror 805 is pressed by a leaf spring from above to be fixed to the rotor portion.

The drive board 801 has screw holes 813, 814, 815, and 816. The optical box 807 has bosses 809, 810, 811, and 812. Screws are screwed and fastened into screw holes formed in the bosses 809, 810, 811, and 812 of the optical box 807 through the screw holes 813, 814, 815, and 816 serving as fixing holes of the drive board 801. In this manner, the deflection device 800 is fixed to the optical box 807.

The bearing 802 is mounted to the drive board 801 by caulking, and hence the angle of the rotary shaft 804 with respect to the drive board 801 varies depending on a manufacturing accuracy and a caulking accuracy of the member. When the drive board 801 is a sheet metal, the drive board 801 may warp. When the drive board 801 warps, the rotary shaft 804 having the rotary polygon mirror 805 mounted thereon may be also inclined in accordance with the warpage to cause shaft inclination. Thus, the reflective surfaces of the rotary polygon mirror 805 are equally inclined. As a result, a reflection angle in a sub-scanning direction of reflected light from the rotary polygon mirror 805 may be deviated from an ideal position, resulting in reduction in optical characteristics. It is difficult to process the mounting seat surfaces 809, 810, 811, and 812 for the drive board 801, which are formed on the optical box 807, to have ideal flat surfaces in a strict sense. Therefore, the deviation from the ideal flat surfaces also appears as the shaft inclination of the rotary polygon mirror 805.

In this type of light scanning apparatus, as an item that influences the productivity of the image forming apparatus for outputting images in a predetermined time period, there may be given the number of revolutions of the motor configured to drive the rotary polygon mirror in addition to the number of light sources and the number of surfaces of the rotary polygon mirror. Therefore, there has been a demand for increase in number of revolutions of the motor in order to increase the productivity of the image forming apparatus for outputting images. Along therewith, there are problems of motor durability, and noise and vibration caused by the motor.

[Problem that Arises when Deflection Devices Having Different Specifications are Mounted to Common Optical Box]

When deflection devices including motors having different numbers of revolutions are allowed to be mounted to a common optical box, the following three problems arise. Description below is made assuming that a common optical system, that is, the common rotary polygon mirror 805 is used to use the common optical box.

The first problem resides in a difference in shaft diameter of the bearing due to a difference in bearing structure of the motor. As illustrated in FIG. 19A and FIG. 19B, in general, the bearing 802 positioned below the motor 803 is fitted to the positioning hole 808 formed in the optical box 807 of the light scanning apparatus. In this manner, the motor 803 is positioned. Therefore, when the bearings 802 have different shaft diameters, conditions illustrated in FIG. 20 and FIG. 21 are required to mount the bearings 802 to the common optical box. FIG. 20 is a perspective view with a partial cross section for illustrating a state in which a motor 803a is mounted to the common optical box 807. FIG. 21 is a perspective view with a partial cross section for illustrating a state in which a motor 803b having a shaft diameter and a length of the bearing that are different from those of the motor 803a is mounted to the common optical box 807.

In a deflection device 800a illustrated in FIG. 20, the motor 803a configured to drive the rotary polygon mirror 805 includes a bearing 802a. The bearing 802a of the motor 803a is fitted to a hole formed in a drive board 801a having mounted thereon a drive circuit for driving the motor 803a. In this manner, the motor 803a is mounted to the drive board 801a. Further, the bearing 802a of the motor 803a is inserted and fitted to a positioning hole 808a formed in the optical box 807. In this manner, the motor 803a is positioned with respect to the optical box 807. In a deflection device 800b illustrated in FIG. 21, the motor 803b configured to drive the rotary polygon mirror 805 includes a bearing 802b. The bearing 802b of the motor 803b is fitted to a hole formed in a drive board 801b having mounted thereon a drive circuit for driving the motor 803b. In this manner, the motor 803b is mounted to the drive board 801b. Further, the bearing 802b of the motor 803b is inserted and fitted to a positioning hole 808b formed in the optical box 807. In this manner, the motor 803b is positioned with respect to the optical box 807.

The bearing 802a of the motor 803a of FIG. 20 is fitted to the positioning hole 808a of the optical box 807. The bearing 802b of the motor 803b of FIG. 21 is fitted to the positioning hole 808b of the optical box 807. The relationship of the shaft diameter between the bearings 802 is represented by Expression (1), and the relationship of the axial length between the bearings 802 is represented by Expression (2).

$$802b > 802a \quad (1)$$

$$802a > 802b \quad (2)$$

In the case of the conditions of Expressions (1) and (2), the hole diameter of the positioning hole 808 of the optical box 807 has a step difference as illustrated in FIG. 20 and FIG. 21. In this manner, the motors 803a and 803b having different shaft diameters can be mounted to the common optical box 807. Meanwhile, when any one of the magnitude relationships of Expressions (1) and (2) is not satisfied, the optical box 807 cannot be shared.

Next, the second problem resides in a difference in height from the back surface of the drive board to the rotary polygon mirror 805 (hereinafter referred to as "mirror height"). As illustrated in FIG. 19A and FIG. 19B, the back surface of the drive board 801 is mounted to abutment surfaces of the optical box 807, which are formed of the bosses 809, 810, 811, and 812. In this manner, the accuracy in the height direction of the rotary polygon mirror 805 is ensured. When there is a difference in mirror height due to a difference in motor structure or other reasons, the mirror heights are required to be set to the same height in order to allow usage of the two motors in the common optical box. Therefore, conditions illustrated in FIG. 22A, FIG. 22B, FIG. 23A, and FIG. 23B are required.

Figure 22A:
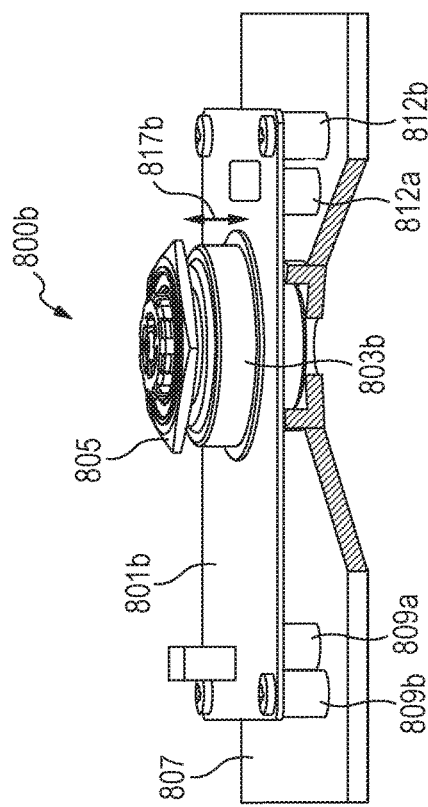
FIG. 22A is a perspective view for illustrating a state in which the deflection device is mounted to the optical box of the comparative example.
Figure 22B:
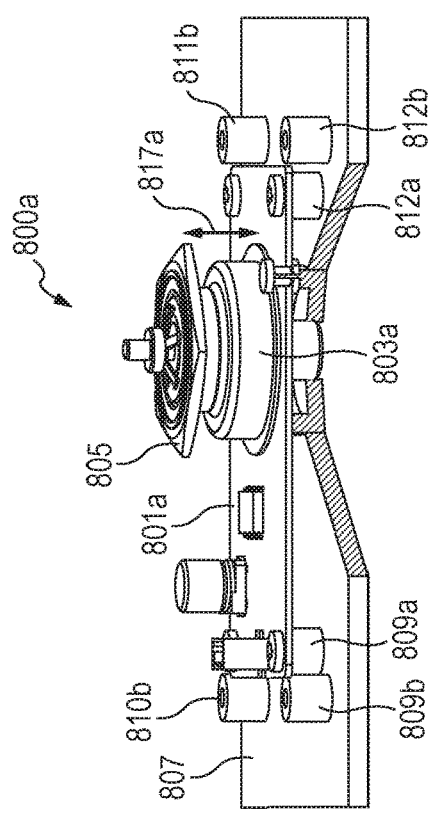
FIG. 22B is a perspective view for illustrating a state in which the deflection device is mounted to the optical box of the comparative example.

FIG. 22A and FIG. 22B are perspective views for illustrating states in which the motors 803a and 803b illustrated in FIG. 20 and FIG. 21, respectively, are mounted to the optical box 807. FIG. 23A and FIG. 23B are perspective views for illustrating methods of mounting the motors 803a and 803b illustrated in FIG. 20 and FIG. 21, respectively, to the optical box 807. The motors 803a and 803b have different mirror heights 817a and 817b as illustrated in FIG. 22A and FIG. 22B, respectively. The magnitude relationship between the mirror heights 817a and 817b is represented by Expression (3).

$$817a > 817b \quad (3)$$

In this case, in order to set the heights from the optical box 807 to the rotary polygon mirror 805 to the same height, the heights of respective bosses 809a to 812a and 809b to 812b formed on the optical box 807 are required to satisfy the following relationship represented by Expression (4).

$$809a = 810a = 811a = 812a < 809b = 810b = 811b = 812b \quad (4)$$

The third problem resides in differences in size of the drive board and screw hole position. As illustrated in FIG. 19A and FIG. 19B, the deflection device 800 is fixed to the optical box 807 with screws screwed into screw holes formed in the bosses 809, 810, 811, and 812 formed on the optical box 807 side through fixing holes (screw holes) 813, 814, 815, and 816 of the deflection device 800.

When the area of the drive board varies depending on a difference in scale of the drive circuit due to the difference in number of revolutions of the motor, the motors also have a difference in screw hole position in accordance therewith. In this case, in order to allow usage of the two motors in the common optical box 807, as illustrated in FIG. 22A, FIG. 22B, FIG. 23A, and FIG. 23B, the size of the drive board is required to satisfy the following magnitude relationship represented by Expression (5). That is, the sizes (areas) of drive substrates of the drive board 801a for the motor 803a and the drive board 801*b* for the motor 803*b* are required to satisfy the following magnitude relationship represented by Expression (5).

$$801a < 801b \quad (5)$$

The condition of Expression (5) is based on the premise that the screw holes 813 to 816 (screw holes 813*a* to 816*a* in the drive board 801*a* and screw holes 813*b* to 816*b* in the drive board 801*b*) are formed at four corners of the drive board 801.

When any one of Expression (4) and Expression (5), which are determined based on the mirror height 817 and the size of the drive board 801, is not satisfied, the optical box 807 cannot be shared. As described above, all of Expression (1) to Expression (5) are required to be satisfied in order to allow the deflection devices including motors having different numbers of revolutions to be mounted to the common optical box 807. However, all of the expressions are not always satisfied.

[First Embodiment]

[Overview of Image Forming Apparatus]

Figure 1:
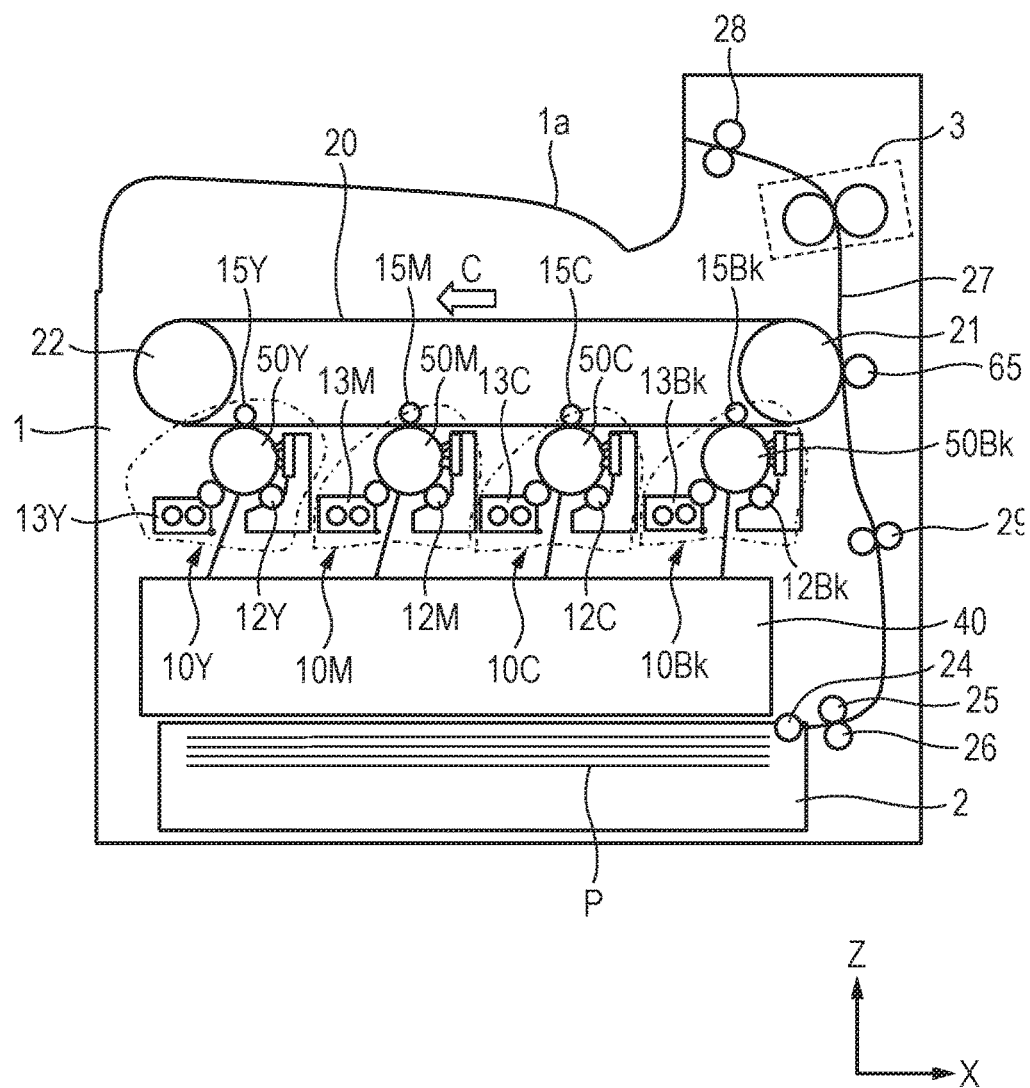
FIG. 1 is a schematic sectional view for illustrating an overall configuration of an image forming apparatus according to first to third embodiments of the present invention.

Now, a configuration of an image forming apparatus according to a first embodiment of the present invention is described. FIG. 1 is a schematic configuration view of an overall configuration of a color laser beam printer of a tandem type according to the first embodiment. The laser beam printer (hereinafter referred to simply as "printer") includes four image forming engines 10Y, 10M, 10C, and 10Bk (indicated by the alternate long and short dash lines in FIG. 1) configured to form toner images for respective colors of yellow (Y), magenta (M), cyan (C), and black (Bk). The printer includes an intermediate transfer belt 20 onto which the toner images are transferred respectively from the image forming portions 10Y, 10M, 10C, and 10Bk. Further, in the printer, the toner images, which are transferred onto the intermediate transfer belt 20, are transferred onto a recording sheet P serving as a recording member, to thereby form a color image. The reference symbols Y, M, C, and Bk representing the respective colors are hereinafter omitted unless needed. In the following description, a direction in which a rotation shaft of a rotary polygon mirror 42 extends is referred to as a Z-axis direction. A main-scanning direction that is a scanning direction of a light beam or a longitudinal direction of a reflecting mirror is referred to as a Y-axis direction. A direction perpendicular to the Y-axis and the Z-axis is referred to as an X-axis direction.

The intermediate transfer belt 20 is formed into an endless shape and is stretched over a pair of belt conveyance rollers 21 and 22 so that the toner image formed by the image forming engine 10 of each color is transferred onto the intermediate transfer belt 20 while the intermediate transfer belt 20 is rotating in a direction indicated by the arrow C. A secondary transfer roller 65 is arranged at a position opposed to one belt conveyance roller 21 across the intermediate transfer belt 20. The recording sheet P passes between the secondary transfer roller 65 and the intermediate transfer belt 20, with the result that the toner image is transferred onto the recording sheet P from the intermediate transfer belt 20. The four image forming engines 10Y, 10M, 10C, and 10Bk are arranged in parallel on a lower side of the intermediate transfer belt 20, and the toner image formed in accordance with image information of each color is transferred onto the intermediate transfer belt 20 (hereinafter referred to as "primary transfer"). The four image forming engines 10 are arranged in the order of the image forming portion 10Y for yellow, the image forming portion 10M for magenta, the image forming portion 10C for cyan, and the image forming portion 10Bk for black in a rotation direction of the intermediate transfer belt 20 (direction indicated by the arrow C).

A light scanning apparatus 40 configured to expose with light a photosensitive drum 50 serving as a photosensitive member provided in each image forming engine 10 in accordance with image information is arranged below the image forming engine 10. The detailed illustration and description of the light scanning apparatus 40 are omitted in FIG. 1 and are made later with reference to FIG. 2. The light scanning apparatus 40 is shared by all of the image forming engines 10Y, 10M, 10C, and 10Bk and includes four semiconductor lasers (not shown) configured to emit a laser beam modulated in accordance with image information of each color. Further, the light scanning apparatus 40 includes the rotary polygon mirror 42 and a motor. The rotary polygon mirror 42 is configured to deflect the light beams so that the light beams corresponding to the respective photosensitive drums 50 scan the photosensitive drums 50 in an axial direction thereof (Y-axis direction). The motor is configured to drive the rotary polygon mirror 42 to rotate. The light beams deflected by the rotary polygon mirror 42 are guided by an optical member provided in the light scanning apparatus 40 to be guided onto the photosensitive drums 50. Then, the photosensitive drums 50 are exposed with the respective light beams.

Each image forming engine 10 includes the photosensitive drum 50 and a charging roller 12 configured to charge the photosensitive drum 50 to a uniform potential. Further, each image forming engine 10 includes a developing device 13 serving as a developing unit configured to form a toner image by developing an electrostatic latent image which is formed on the photosensitive drum 50 by being exposed with the light beam radiated thereonto. The developing device 13 is configured to develop the electrostatic latent image on the photosensitive drum 50 with toner.

A primary transfer roller 15 is arranged at a position opposed to the photosensitive drum 50 of each image forming engine 10 across the intermediate transfer belt 20. A transfer voltage is applied to the primary transfer roller 15. With this action, the toner image on the photosensitive drum 50 is transferred onto the intermediate transfer belt 20.

The recording sheet P is supplied from a feed cassette 2 received in a lower portion of a printer casing 1 to an inner portion of the printer, specifically a secondary transfer position at which the intermediate transfer belt 20 and the secondary transfer roller 65 serving as a transfer unit come into abutment on each other. In an upper portion of the feed cassette 2, a pickup roller 24 configured to pull out the recording sheet P received in the feed cassette 2 and a feed roller 25 are arranged in parallel. A retard roller 26 for preventing overlap feeding of the recording sheet P is arranged at a position opposed to the feed roller 25. A conveyance path 27 of the recording sheet P inside the printer is provided substantially vertically along a right side surface of the printer casing in FIG. 1. The recording sheet P pulled out from the feed cassette 2 positioned in a bottom portion of the printer casing 1 ascends through the conveyance path 27 and is sent to registration rollers 29 configured to control an entry timing of the recording sheet P with respect to the secondary transfer position. After the toner image is transferred onto the recording sheet P at the secondary transfer position, the recording sheet P is sent to a fixing device 3 (indicated by the broken line in FIG. 1) arranged on a downstream side in a conveyance direction. Then, the recording sheet P having the toner image fixed thereon by the fixing device 3 is delivered to a delivery tray 1a arranged in an upper portion of the printer casing 1 through delivery rollers 28.

When a color image is to be formed by the color laser beam printer, first, the light scanning apparatus 40 exposes with light the photosensitive drum 50 of each image forming engine 10 at a predetermined timing in accordance with image information of each color. Consequently, a latent image in accordance with the image information is formed on the photosensitive drum 50 of each image forming engine 10. In order to obtain high image quality, the latent image formed by the light scanning apparatus 40 is required to be reproduced with high accuracy at a predetermined position on each of the photosensitive drums 50, while the amount of light beam for forming the latent image is required to constantly have a desired value in a stable manner.

[Configuration of Light Scanning Apparatus]

Figure 2:
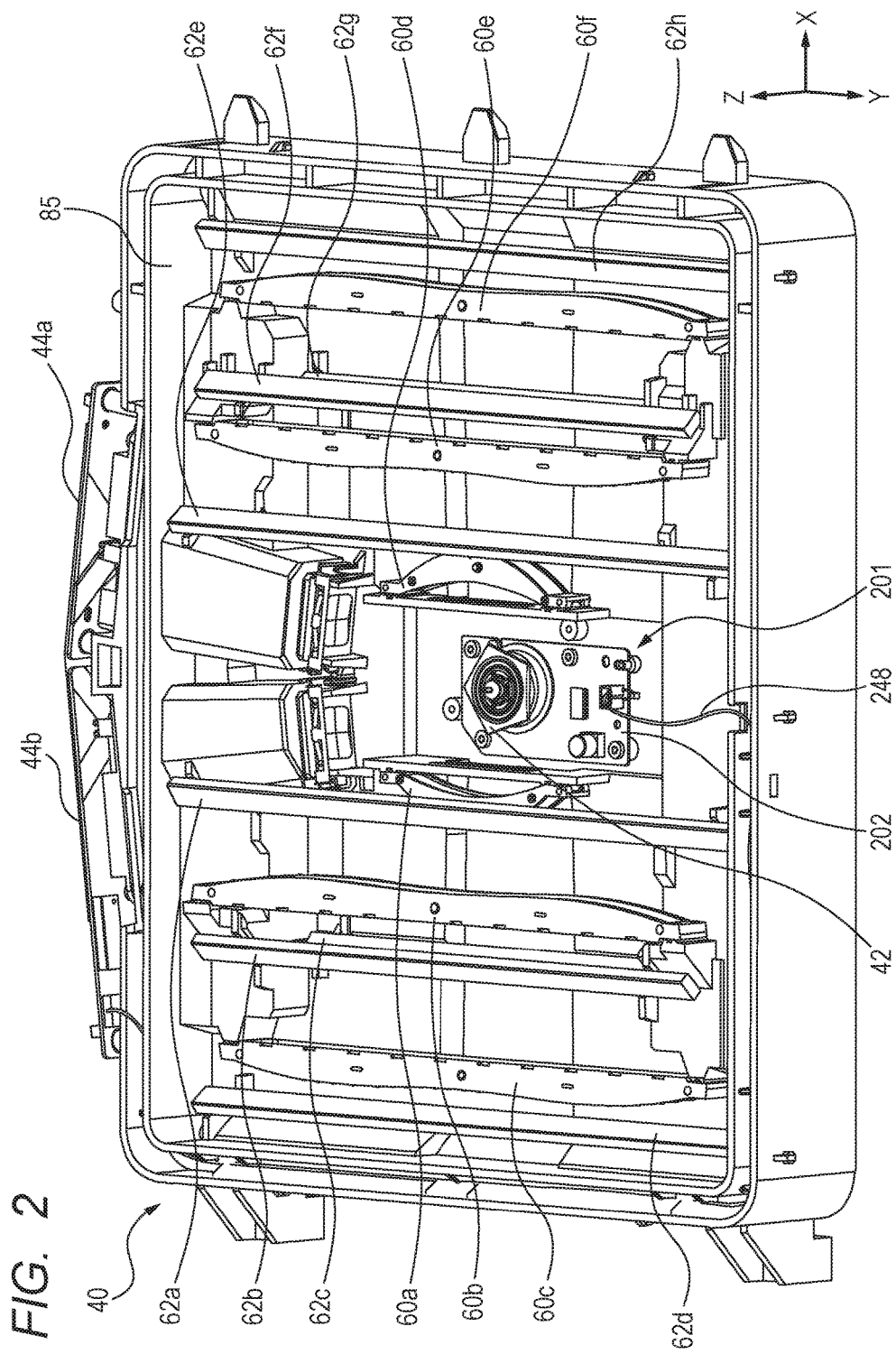
FIG. 2 is a perspective view for illustrating a configuration of a light scanning apparatus according to the first to third embodiments.

FIG. 2 is a perspective view for illustrating the configuration of the light scanning apparatus 40 that is mounted to the printer being the image forming apparatus of FIG. 1. The light scanning apparatus 40 illustrated in FIG. 2 employs a system of exposing the photosensitive drums 50 of the plurality of image forming portions with light by using the single rotary polygon mirror 42 for the purpose of downsizing the image forming apparatus. In FIG. 2, the rotary polygon mirror 42 to be used in common by the plurality of image forming portions is provided at a center portion of the light scanning apparatus 40. Laser light emitted from each of light source units 44a and 44b is deflected by the rotary polygon mirror 42. After that, a surface of the corresponding photosensitive drum 50 is exposed with the laser light that has passed through a scanning optical system and reflective mirrors provided for each of the light sources. In the light scanning apparatus 40, optical systems are arranged respectively in the right-left direction of FIG. 2 with respect to the rotary polygon mirror 42. Each of the light source units 44a and 44b includes light emitting portions for two colors of toner. The surface of each of the photosensitive drums 50Bk and 50C of the image forming portions corresponding to black (K) and cyan (C) is exposed with laser light emitted from the light source unit 44a. The surface of each of the photosensitive drums 50M and 50Y of the image forming portions corresponding to magenta (M) and yellow (Y) is exposed with laser light emitted from the light source unit 44b.

Each of the light source units 44a and 44b includes a semiconductor laser (not shown), a collimator lens (not shown) configured to convert the laser light emitted from the semiconductor laser into collimated light, and a cylindrical lens (not shown) configured to image the laser light in a linear shape on the rotary polygon mirror 42. The laser light passes through imaging lenses 60a, 60b, 60c, 60d, 60e, and 60f configured to scan the laser light at a constant speed and form an image on the photosensitive drum 50. The laser light that has passed through the imaging lenses of an imaging optical system is reflected by reflective mirrors 62a, 62b, 62c, 62d, 62e, 62f, 62g, and 62h to form an electrostatic latent image on the photosensitive drum 50. Each of the reflective mirrors 62a to 62h reflects (folds) the laser light in a predetermined direction so as to guide the laser light to the photosensitive drum 50 of the corresponding image forming engine 10. The light scanning apparatus 40 includes a casing 85 (also referred to as "optical box 85") accommodating the components illustrated in FIG. 2, and an opening portion at the upper portion of the light scanning apparatus 40 is tightly sealed by a lid (not shown).

[Configuration of Deflection Device]

Figure 3:
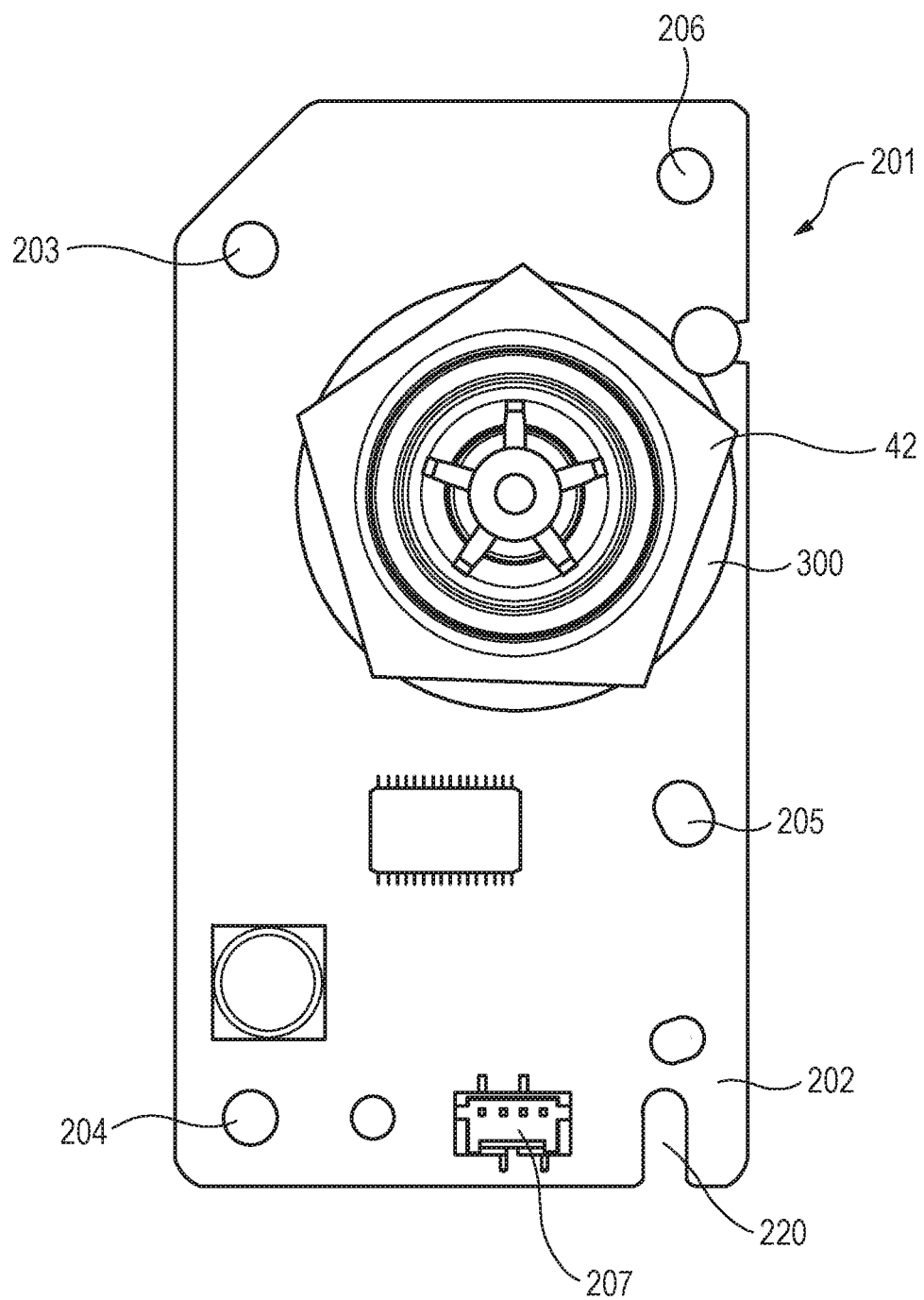
FIG. 3 is a view of an outer appearance of a deflection device using a low-speed motor in the first to third embodiments.
Figure 4:
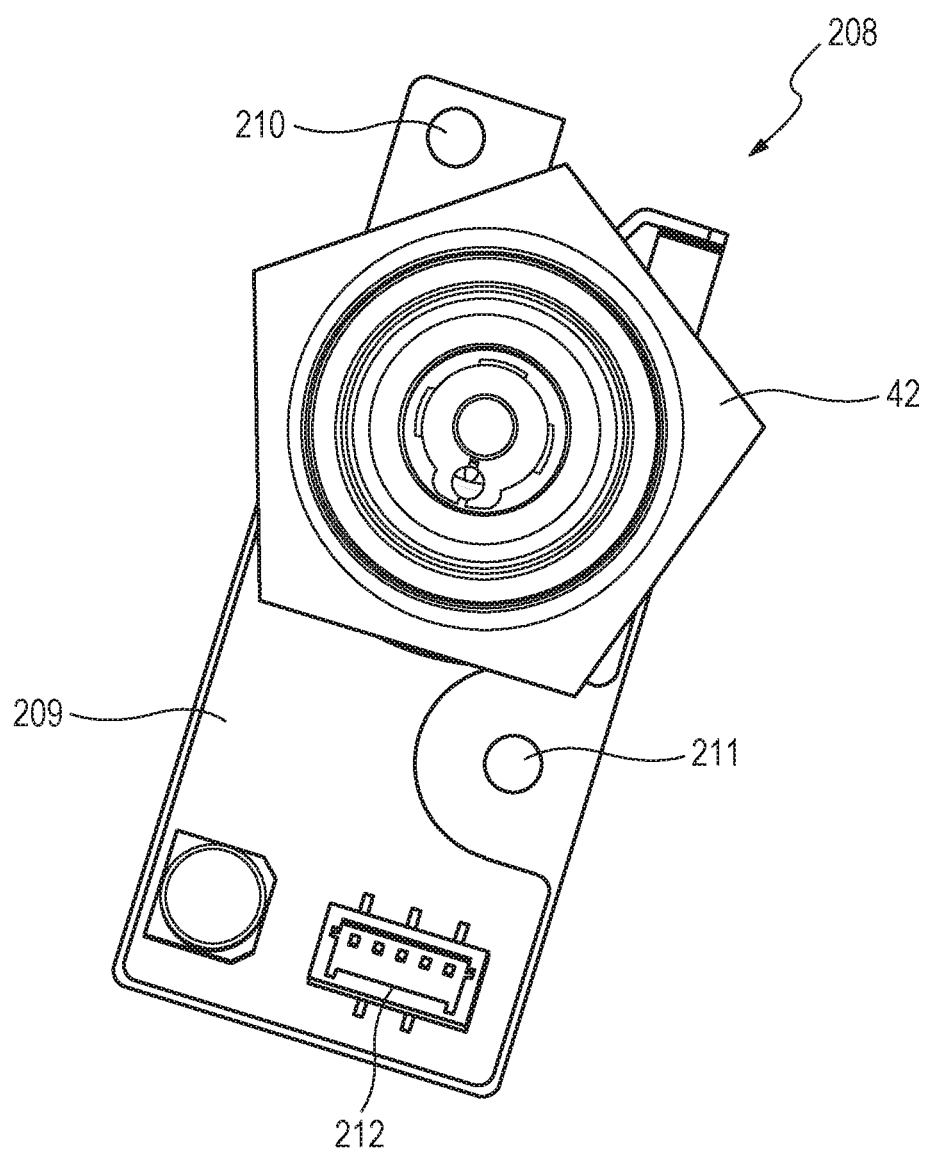
FIG. 4 is a view of an outer appearance of a deflection device using a high-speed motor in the first to third embodiments.

FIG. 3 is a top view of a deflection device 201 serving as a first deflection portion using a low-speed motor 300 to be used in the first embodiment. FIG. 4 is a top view of a deflection device 208 serving as a second deflection portion using a high-speed motor 301. The deflection devices 201 and 208 are mounted to a common optical box, and use a common optical system including lenses and reflective mirrors. Therefore, the deflection devices 201 and 208 have the common rotary polygon mirror 42 mounted thereon.

(Configuration of Deflection Device Including Low-Speed Motor)

FIG. 3 is a top view for illustrating an outer appearance of the deflection device 201 using the low-speed motor 300 serving as a first motor as viewed from above. The deflection device 201 includes the rotary polygon mirror 42 (first rotary polygon mirror), a connector 207 to which a wire bundle (see FIG. 7) including a signal line for an image forming apparatus main body, which is necessary for drive of the motor, is connected, a drive circuit configured to drive the motor, and a drive board 202 having those components mounted thereon. The drive board 202 serving as a first board has fixing holes 203, 204, 205, and 206 serving as screw holes for fixing the drive board 202 to the optical box 85. When the deflection device 201 is to be positioned with respect to the optical box 85, the bearing of the motor is fitted to a positioning hole of the optical box 85. In order to prevent rotation of the drive board 202 at this time, the drive board 202 has a rotation regulation portion 220 serving as an opening for regulating the rotation.

(Configuration of Deflection Device Including High-speed Motor)

FIG. 4 is a top view for illustrating an outer appearance of the deflection device 208 using the high-speed motor 301 (see FIG. 5A and FIG. 5B) serving as a second motor that has a maximum number of revolutions that is higher than the maximum number of revolutions of the low-speed motor 300 as viewed from above. The deflection device 208 includes the rotary polygon mirror 42 (second rotary polygon mirror), a connector 212 to which a wire bundle (see FIG. 11) including a signal line for the image forming apparatus main body, which is necessary for drive of the motor, is connected, a drive circuit configured to drive the motor, and a drive board 209 having those components mounted thereon. The drive board 209 serving as a second board has fixing holes 210 and 211 serving as screw holes for fixing the drive board 209 to the optical box 85. The sizes of the deflection device 201 illustrated in FIG. 3 and the deflection device 208 illustrated in FIG. 4 are compared. It is understood that, because the rotary polygon mirror 42 is a member shared by the deflection devices 201 and 208, there is obtained a relationship in which the area of the drive board 202 of the deflection device 201 is larger than the area of the drive board 209 of the deflection device 208.

[Height of Rotary Polygon Mirror of Deflection Device]

Figure 5A:
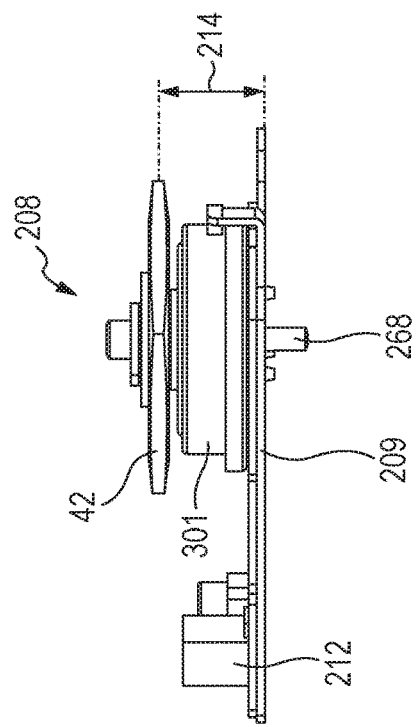
FIG. 5A is a side view for illustrating a mirror height of the low-speed deflection device in the first to third embodiments.
Figure 5B:
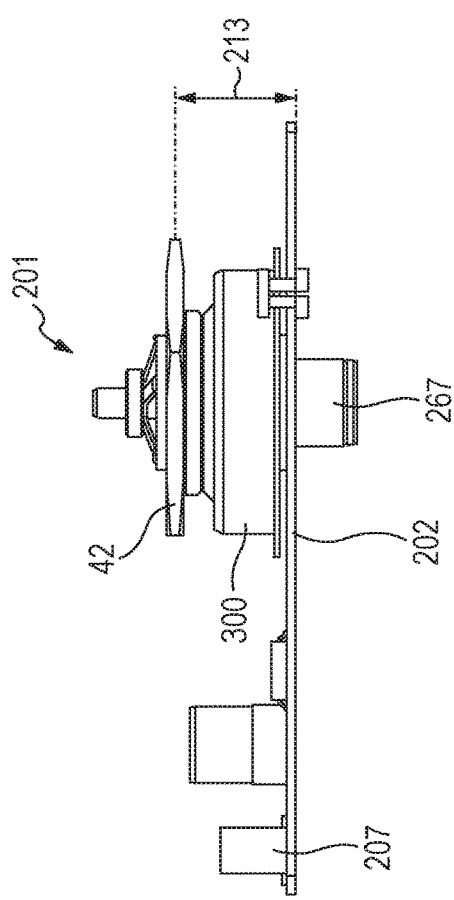
FIG. 5B is a side view for illustrating the mirror height of the high-speed deflection device in the first to third embodiments.

FIG. 5A and FIG. 5B are side views of the deflection device 201 illustrated in FIG. 3 and the deflection device 208 illustrated in FIG. 4 as viewed from the right side in FIG. 3 and FIG. 4, respectively. In order to respectively mount the two deflection devices 201 and 208 to the common optical box 85 and use the two deflection devices 201 and 208 in a common optical system, the heights of the rotary polygon mirror 42 from the bottom surface of the optical box 85 are required to be set to the same height. In FIG. 5A and FIG. 5B, illustrations are made so that the height of the rotary polygon mirror 42 included in the deflection device 201 of FIG. 5A and the height of the rotary polygon mirror 42 included in the deflection device 208 of FIG. 5B are set to the same height. In FIG. 5A, the motor 300 configured to drive the rotary polygon mirror 42 includes a bearing 267. A mirror height 213 represents a height from a back surface of the drive board 202 (surface opposing to seat surfaces of the optical box 85) to the mirror surface of the rotary polygon mirror 42. Similarly, in FIG. 5B, the motor 301 configured to drive the rotary polygon mirror 42 includes a bearing 268. A mirror height 214 represents a height from a back surface of the drive board 209 (surface opposing to the seat surfaces of the optical box 85) to the mirror surface of the rotary polygon mirror 42.

In the deflection devices 201 and 208, the back surfaces of the drive boards 202 and 209 are respectively mounted to seat surfaces for the drive boards 202 and 209, which are formed on the optical box 85. In this manner, the height (position) of the rotary polygon mirror 42 from the bottom surface of the optical box 85 is determined. Therefore, what is important is the magnitude relationship between the mirror height 213 of the deflection device 201 and the mirror height 214 of the deflection device 208. It is understood from FIG. 5A and FIG. 5B that the mirror height 213 of the deflection device 201 (FIG. 5A) is larger than the mirror height 214 of the deflection device 208 (FIG. 5B).

[Configurations of Seat Surfaces of Optical Box]

Figure 6:
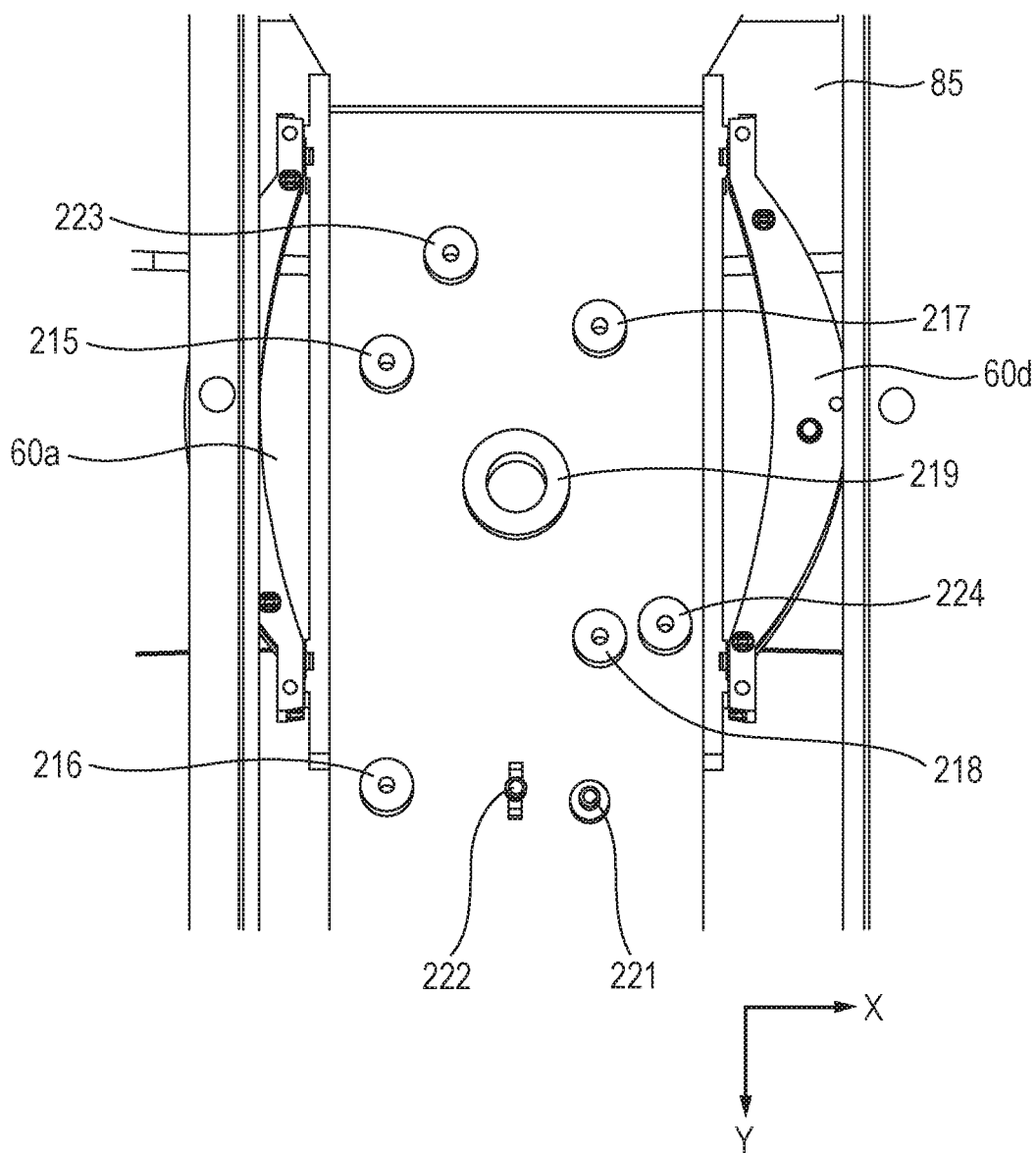
FIG. 6 is a perspective view for illustrating mounting seat surfaces of an optical box of the first embodiment.

Next, the common optical box 85 which is used in the first embodiment and to which the deflection devices 201 and 208 are mounted is described. FIG. 6 is a perspective view for illustrating the shape of the bottom surface of the optical box 85 not having the deflection devices 201 and 208 mounted thereon as viewed from the above. The optical box 85 has a positioning hole 219. The bearings 267 and 268 of the motors of the deflection devices 201 and 208 are fitted to the positioning hole 219 to position the motors. Further, the optical box 85 has mounting seat surfaces 215, 216, 217, and 218 serving as first seat surfaces and mounting seat surfaces 223 and 224, which are used to mount the deflection devices 201 and 208, and rotation regulation bosses 221 and 222.

(Mounting of Deflection Device Including Low-speed Motor to Optical Box)

Figure 7:
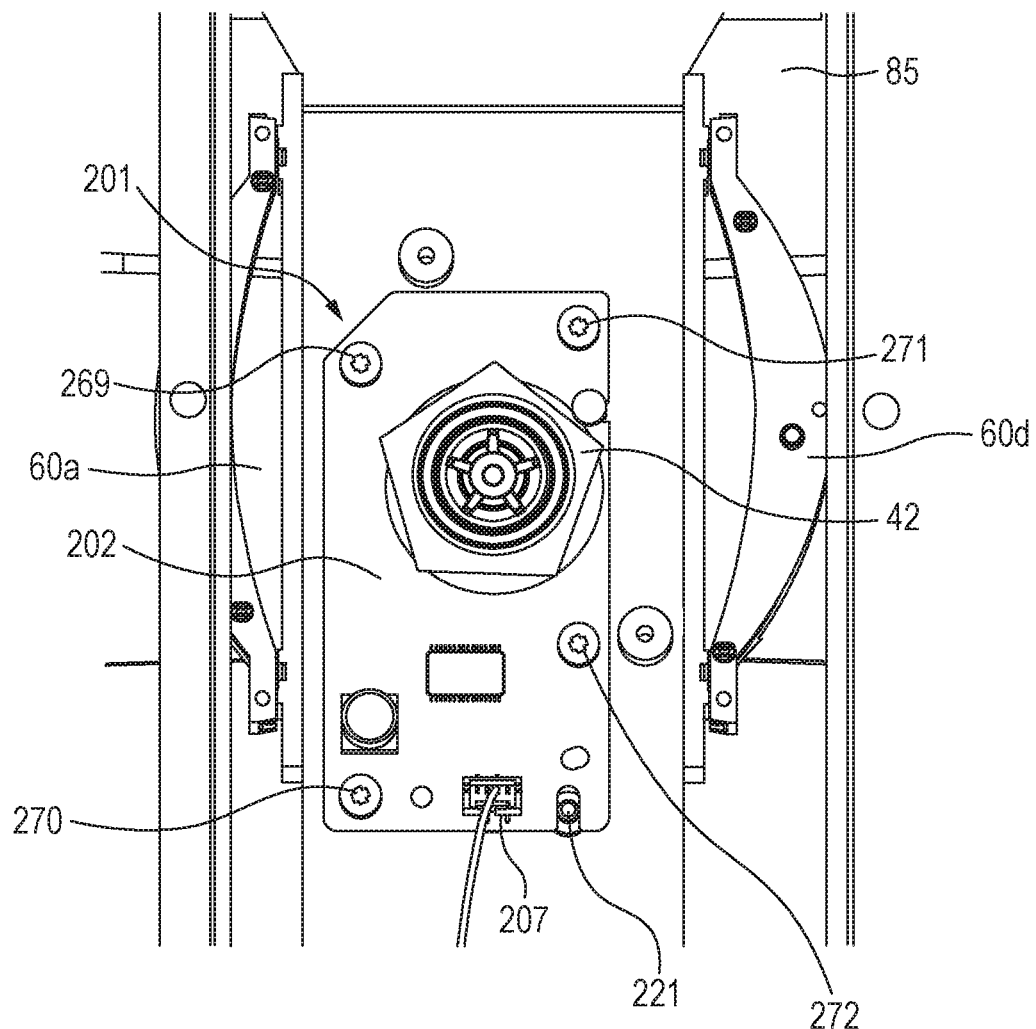
FIG. 7 is a perspective view for illustrating a state in which the low-speed deflection device is mounted to the optical box of the first embodiment.

FIG. 7 is a perspective view for illustrating a state in which the deflection device 201 is mounted to the optical box 85 illustrated in FIG. 6. In FIG. 7, the bearing 267 of the motor protruded from the back surface of the drive board 202 is fitted to the positioning hole 219 illustrated in FIG. 6. In this manner, a rotary center axis of the rotary polygon mirror 42 is determined. The drive board 202 is positioned by fitting the rotation regulation boss 221 to the rotation regulation portion 220 (FIG. 3) formed in the drive board 202. Then, under this state, a screw 269 is fastened to the mounting seat surface 215 of the optical box 85 through the fixing hole 203 formed in the drive board 202. A screw 270 is fastened to the mounting seat surface 216 of the optical box 85 through the fixing hole 204 formed in the drive board 202. Similarly, a screw 271 is fastened to the mounting seat surface 217 of the optical box 85 through the fixing hole 206 formed in the drive board 202. A screw 272 is fastened to the mounting seat surface 218 of the optical box 85 through the fixing hole 205 formed in the drive board 202. In this manner, the deflection device 201 including the low-speed motor is fixed to the optical box 85.

[Problem that Arises when Deflection Device Including High-speed Motor is Mounted to Optical Box]

A method of mounting the deflection device 201 including the low-speed motor to the optical box 85 has been described. When the deflection device 208 including the high-speed motor is mounted to the optical box 85 by a similar method, the following problem arises due to the difference in specification between the deflection devices 201 and 208. That is, the mirror height 213 of the deflection device 201 is larger than the mirror height 214 of the deflection device 208, and the area of the drive board 202 of the deflection device 201 is larger than the area of the drive board 209 of the deflection device 208. Therefore, in order to mount the drive board 209 of the deflection device 208 to the optical box 85, mounting seat surfaces for the drive board 209, which have heights that are larger than those of the mounting seat surfaces 215 to 218 for the deflection device 201, are required within a region in which the drive board 202 of the deflection device 201 is arranged. However, when the mounting seat surfaces for the drive board 209 having such heights are formed on the optical box 85, the drive board 202 of the deflection device 201 cannot be mounted to the optical box 85. Therefore, the optical box 85 cannot be shared by the two deflection devices 201 and 208.

In order to address this problem, the following method is conceivable. That is, the drive board 209 of the deflection device 208 is once fixed to a mounting portion being another member, and the mounting portion having the drive board 209 mounted thereon is fastened to any position of the optical box 85. In this case, the deflection device 208 is fixed to the optical box 85 through intermediation of the mounting portion being another member. Therefore, the shaft inclination accuracy of the high-speed motor mounted to the deflection device 208 may be reduced due to the intermediation of one component. The first embodiment has a feature in that, in order to prevent reduction in shaft inclination accuracy of the motor, the drive board 209 of the deflection device 208 is fixed to the optical box 85 at positions having a span larger than that of seat surfaces for fixing the drive board 202 of the deflection device 201. Now, the mounting portion for the deflection device 208 including the high-speed motor and a mounting method thereof to the optical box 85 are described.

[Mounting Portion for Deflection Device Including High-speed Motor]

FIG. 8A is a perspective view for illustrating a mounting portion 238 which is used in the first embodiment and to which the deflection device 208 is mounted. In FIG. 8A, the mounting portion 238 has a positioning hole 229. The bearing 268 of the motor of the deflection device 208 is fitted to the positioning hole 229 so that the rotary center axis of the rotary polygon mirror 42 is positioned. Further, the mounting portion 238 has mounting seat surfaces 225 and 226 arranged so as to be in contact with the back surface of the drive board 209 of the deflection device 208 and determine the mirror height of the rotary polygon mirror 42. The mounting seat surfaces 225 and 226 correspond to the fixing holes 210 and 211, respectively, in the drive board 209 of the deflection device 208 illustrated in FIG. 4. Further, the mounting portion 238 has rotation regulation ribs 236 and 237 for regulating the drive board 209 in a rotation direction, a rotation regulation portion 235 serving as an opening for regulating the rotation of the mounting portion 238, and fixing holes 230, 231, and 232 for fixing the mounting portion 238 to the mounting seat surfaces of the optical box 85. Fixing holes 233 and 234 are screw holes to be used when a cover 253 (see FIG. 14A and FIG. 14B) is mounted.

FIG. 8B is a perspective view for illustrating a state in which the deflection device 208 is fixed to the mounting portion 238. When the drive board 209 of the deflection device 208 is mounted to the mounting portion 238, the drive board 209 is regulated in the rotation direction by the rotation regulation ribs 236 and 237, and thus the drive board 209 is positioned. Under this state, a screw 227 is fastened to the mounting seat surface 225 of the mounting portion 238 through the fixing hole 210 formed in the drive board 209. A screw 228 is fastened to the mounting seat surface 226 of the mounting portion 238 through the fixing hole 211 formed in the drive board 209. In this manner, the deflection device 208 is fixed to the mounting portion 238. The deflection device 208 is integrally mounted to the mounting portion 238 in this way, and thus a high-speed deflection unit 243 including the high-speed motor is obtained. An opening 244 is an opening for a wire bundle from which the wire bundle connected to the connector 212 is led out.

[Configuration of High-speed Deflection Unit]

Figure 9:
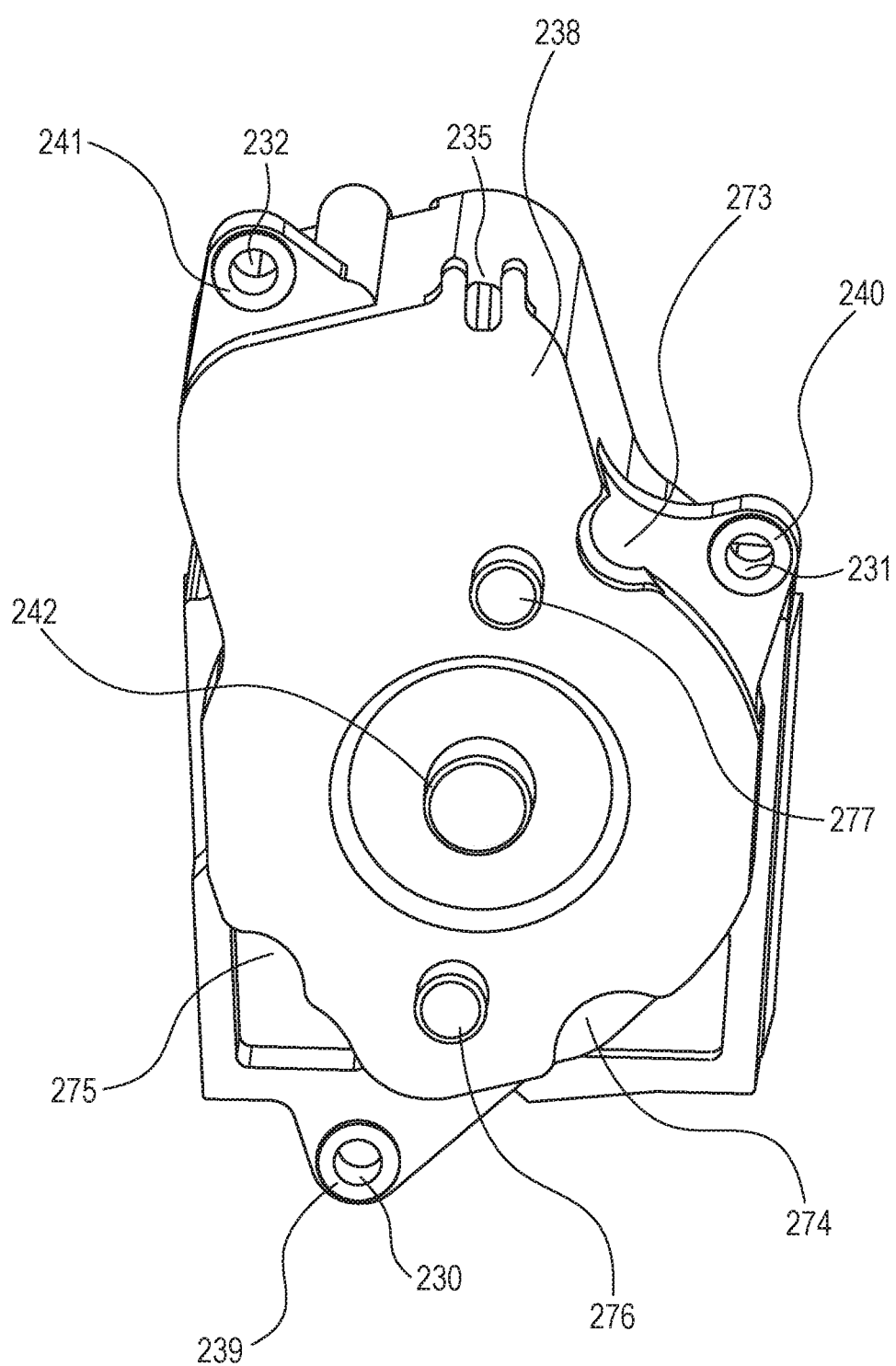
FIG. 9 is a perspective view for illustrating a back surface of the mounting portion in the first embodiment.

Next, a method of mounting the high-speed deflection unit 243 to the optical box 85 is described. As illustrated in FIG. 8A and FIG. 8B, the mounting portion 238 has the rotation regulation portion 235 and the fixing holes 230, 231, and 232 being screw holes. FIG. 9 is a perspective view for illustrating an outer appearance of the mounting portion 238 illustrated in FIG. 8A and FIG. 8B as viewed from the back surface of the mounting portion 238, which is the side to be brought into abutment against the optical box 85. Seat surfaces 239, 240, and 241 are formed around the back sides of the fixing holes 230, 231, and 232 formed in the mounting portion 238 to fix the mounting portion 238 to the mounting seat surfaces of the optical box 85. The back surface of the mounting portion 238 has a positioning shaft 242 that is formed coaxially with the positioning hole 229. Further, the back surface of the mounting portion 238 has clearance shape portions 273, 274, and 275 (see FIG. 11) and screw-receiving shape portions 276 and 277 (see FIG. 13) are formed.

[Configurations of Seat Surfaces for Deflection Device of Optical Box]

Figure 10:
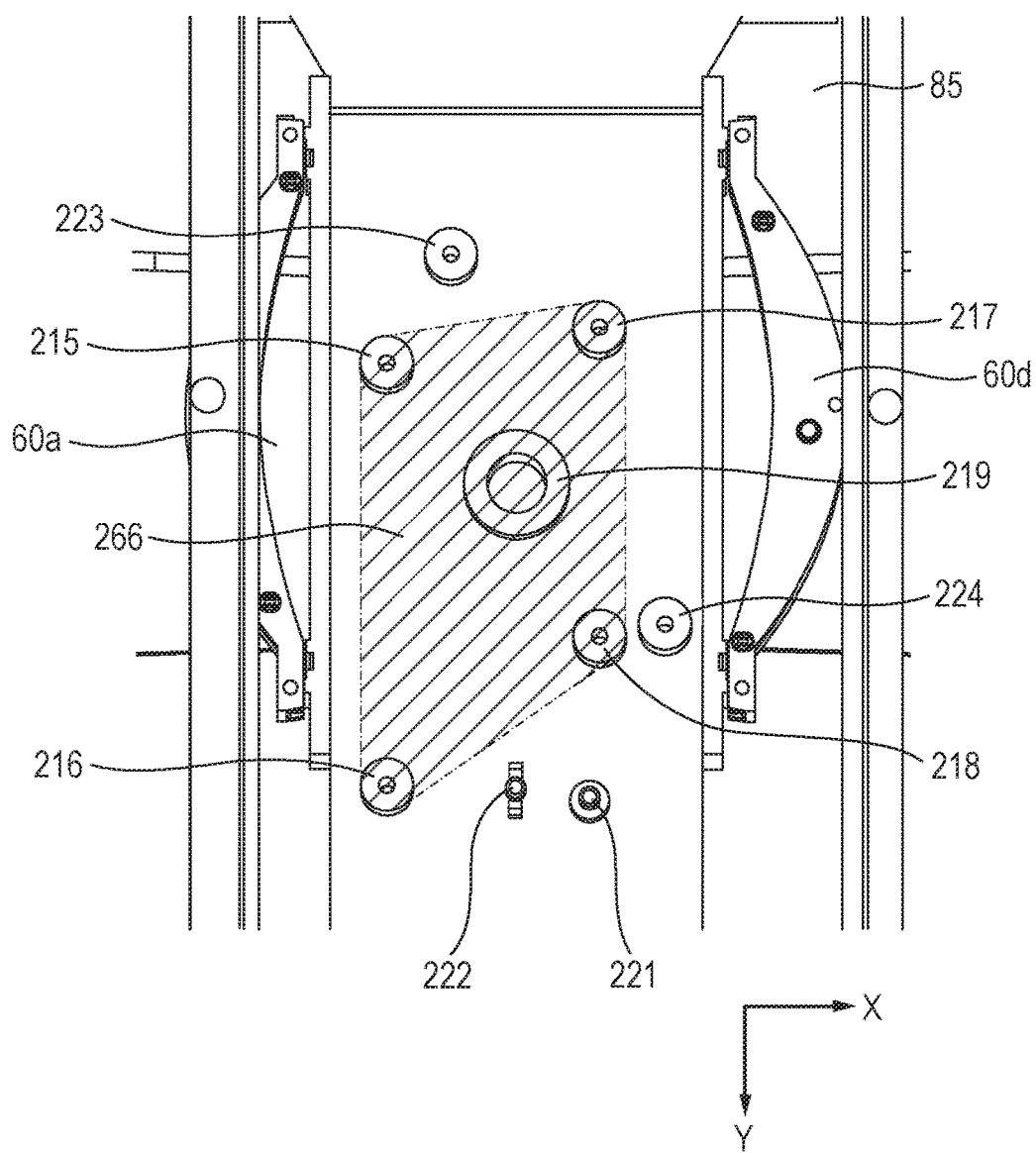
FIG. 10 is a perspective view for illustrating the mounting seat surfaces of the optical box of the first embodiment.

The shapes of the mounting seat surfaces of the optical box corresponding to the high-speed deflection unit 243 are described with reference to the drawings. FIG. 10 is a perspective view for illustrating the shapes of the seat surfaces of the optical box 85 before the high-speed deflection unit 243 is mounted. The optical box 85 has mounting seat surfaces 223 and 224 in addition to the mounting seat surfaces 215 to 218 used for fixing the deflection device 201 including the low-speed motor. When the high-speed deflection unit 243 is fixed to (supported by) the optical box 85, three mounting seat surfaces (second seat surfaces), that is, the mounting seat surfaces 223 and 224 and the mounting seat surface 216 used when the deflection device 201 is fixed are used. In this case, all of the mounting seat surfaces 215 to 218 used when the deflection device 201 is fixed and the mounting seat surfaces 223 and 224 have the same height from the bottom surface of the optical box 85.

The seat surfaces 239, 240, and 241 (FIG. 9) of the fixing holes 230, 231, and 232 formed in the back surface of the high-speed deflection unit 243 opposing to the optical box 85 correspond to the mounting seat surfaces 223, 224, and 216 of the optical box 85, respectively. When the high-speed deflection unit 243 is to be positioned, the positioning shaft 242 (FIG. 9) is fitted to the positioning hole 219 of the optical box 85, and the rotation regulation portion 235 (FIG. 8A and FIG. 8B) is fitted to the rotation regulation boss 222. In this manner, the high-speed deflection unit 243 is positioned. A seat surface region 266, in which the mounting seat surfaces 215 to 218 for the deflection device 201 are formed, is described later.

[Mounting of High-Speed Deflection Unit to Optical Box]

Figure 11:
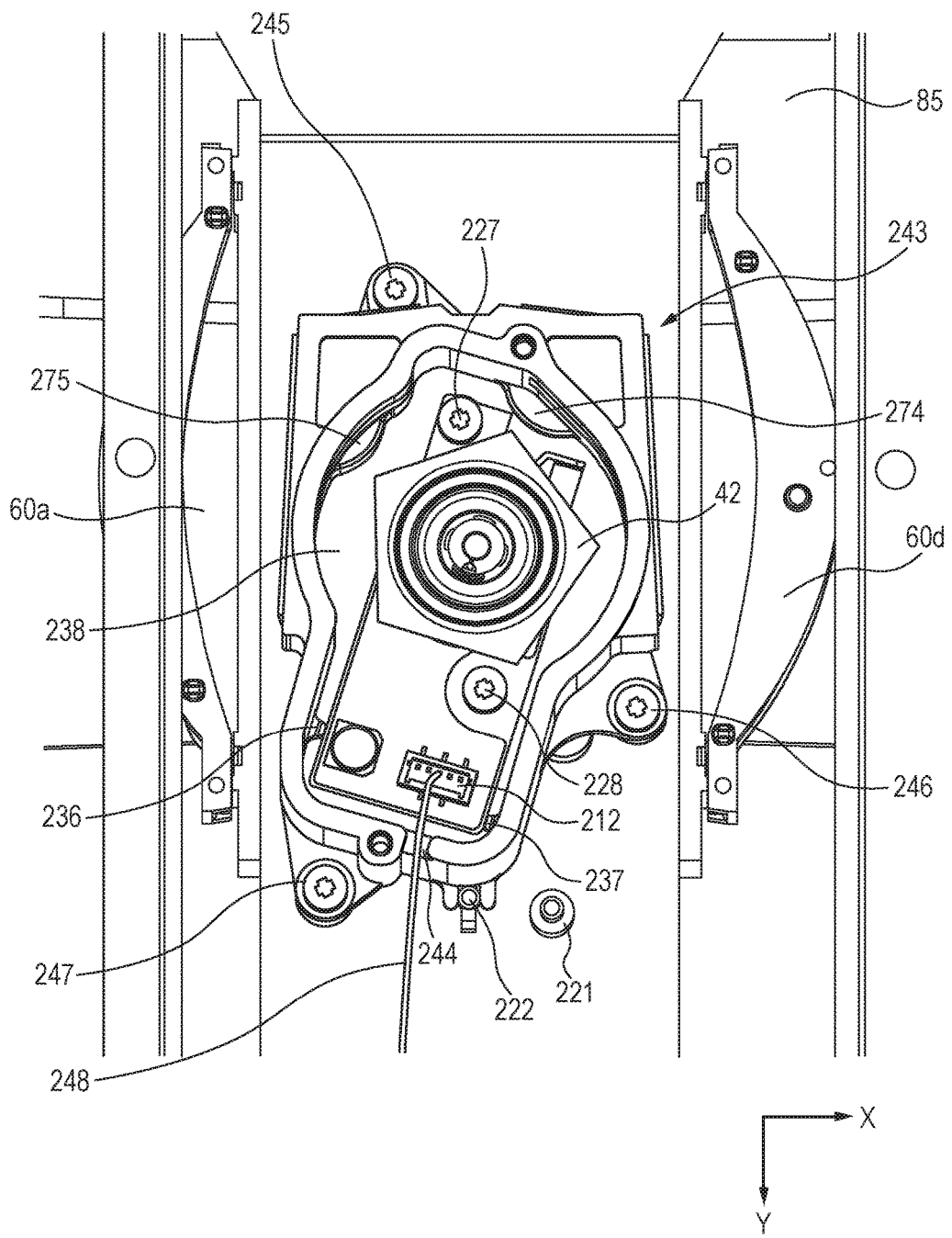
FIG. 11 is a perspective view for illustrating a state in which the high-speed deflection unit is mounted to the optical box of the first embodiment.

FIG. 11 is a perspective view for illustrating a state in which the high-speed deflection unit 243 is mounted to the optical box 85 as viewed from above. Under a state in which the high-speed deflection unit 243 is mounted to the optical box 85, a screw 245 is fastened to the mounting seat surface 223 of the optical box 85 through the fixing hole 230 of the mounting portion 238. Similarly, a screw 246 is fastened to the mounting seat surface 224 of the optical box 85 through the fixing hole 231 of the mounting portion 238. A screw 247 is fastened to the mounting seat surface 216 of the optical box 85 through the fixing hole 232 of the mounting portion 238. In this manner, the high-speed deflection unit 243 is fixed to the optical box 85. At this time, the mounting portion 238 is prevented from being in contact with the mounting seat surfaces 215, 217, and 218 for the deflection device 201, which are formed on the optical box 85, due to the clearance shape portions 275, 274, and 273 (FIG. 9) formed in the back surface. As a result, the low-speed deflection device 201 and the high-speed deflection unit 243 can be mounted to the common optical box 85. The rotation regulation portion 235 (FIG. 8A and FIG. 8B) is fitted to the rotation regulation boss 222 so that the high-speed deflection unit 243 is positioned. A wire bundle 248 connected to the connector 212 of the high-speed deflection device 208 passes through the opening 244 for the wire bundle, which is formed in the mounting portion 238, and is connected to a predetermined electrical board as appropriate.

Figure 12:
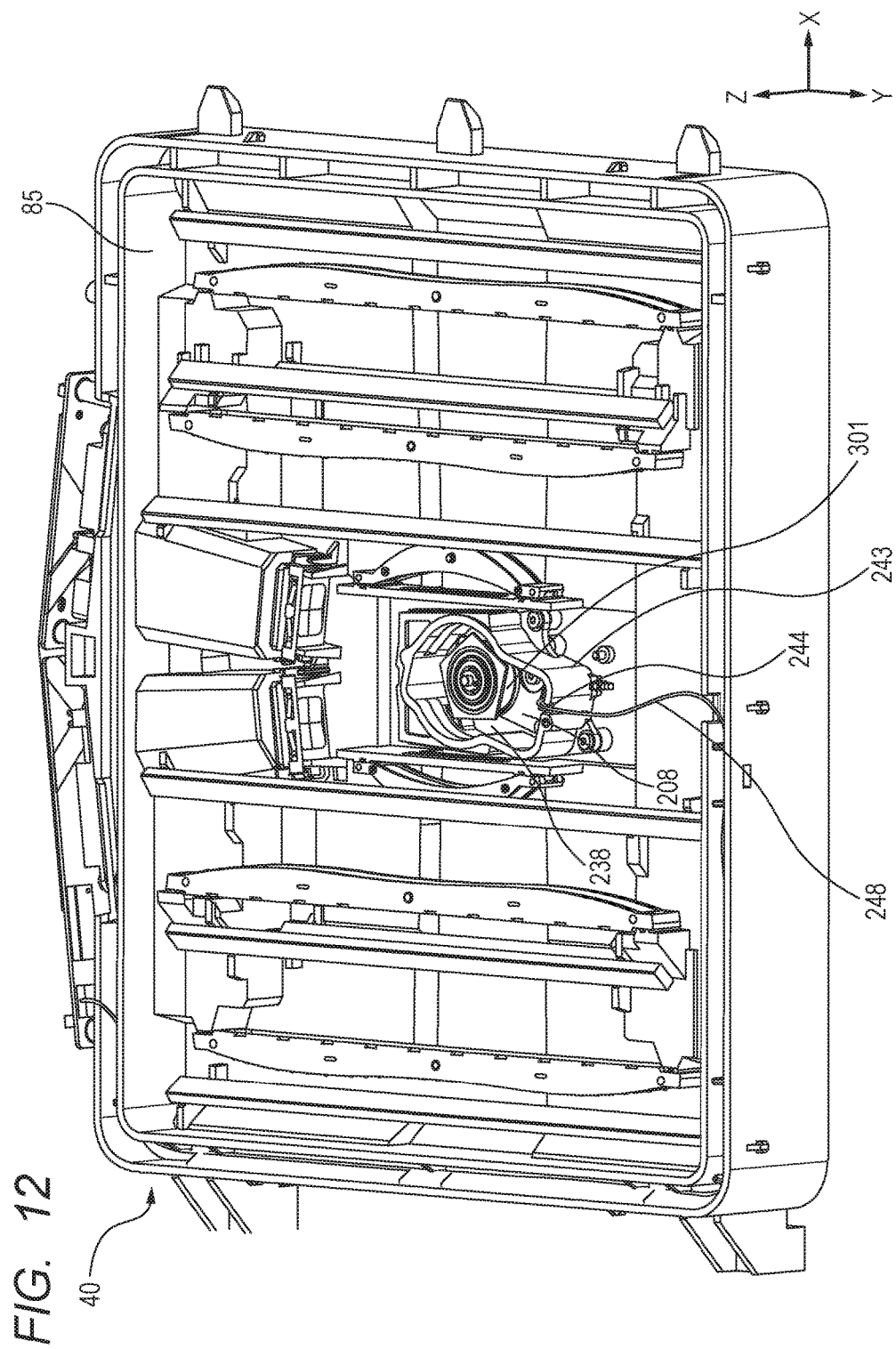
FIG. 12 is a perspective view for illustrating a state in which the high-speed deflection unit is mounted to the optical box of the first embodiment.

FIG. 12 is a perspective view of the light scanning apparatus 40 for illustrating a state in which the high-speed deflection unit 243 is mounted to the optical box 85. Only major reference symbols are illustrated. In FIG. 12, the wire bundle 248 connected to the connector 212 provided on the drive board 209 of the deflection device 208 passes through the opening 244 for the wire bundle, which is formed in the mounting portion 238 illustrated in FIG. 8A and FIG. 8B. The wire bundle 248 is connected to a predetermined electrical board (not shown) as appropriate. In this manner, even in the case of the high-speed deflection unit 243, a wire bundle 248 similar to the wire bundle of the low-speed deflection device 201 can be used.

The deflection device 208 is fastened to the optical box 85 through intermediation of the mounting portion 238, and hence the shaft inclination accuracy of the deflection device 208 may be reduced. In view of this, as illustrated in FIG. 10, the seat surfaces for fastening the high-speed deflection unit 243 are arranged as follows. That is, at least one of the seat surfaces for fastening the high-speed deflection unit 243 is arranged outside of the seat surface region 266 (shaded portion in FIG. 10) obtained by connecting the mounting seat surfaces 215, 216, 217, and 218 for supporting the low-speed deflection device 201. In the first embodiment, the mounting seat surface 216 of the optical box 85 is a seat surface to be used in common by the high-speed deflection unit 243 and the low-speed deflection device 201. Therefore, the mounting seat surfaces 223 and 224 are seat surfaces for the high-speed deflection unit 243, which are arranged outside of the seat surface region 266. When the mounting seat surfaces for the high-speed deflection unit 243 are arranged outside of the seat surface region 266 for the low-speed deflection device 201, a span between the mounting seat surfaces (distance between the mounting seat surfaces) for the high-speed deflection unit 243 is increased. The increased span can reduce the sensitivity with respect to the shaft inclination of the motor when there is a difference in height between the mounting seat surfaces. As a result, the reduction in shaft inclination accuracy of the high-speed deflection device 208 due to the intermediation of the mounting portion 238 can be prevented. The span between the mounting seat surfaces to which the high-speed deflection unit 243 is mounted can be freely set depending on design conditions. Therefore, the span may be further increased depending on the shaft inclination accuracy required in the optical system to be used.

The mounting portion 238 used in the first embodiment is assumed to be made of a material that can be used in die casting, for example, aluminum, zinc, and magnesium. A component made of those materials by die casting may be subjected to secondary processing as necessary to cut the accurate seat surfaces so that the component has higher accuracy. A part of the mounting portion 238 in this case that affects the shaft inclination accuracy of the high-speed deflection device 208 is the following inclination component. That is, there is given an inclination component of a plane formed of the accurate seat surfaces (mounting seat surfaces) 225 and 226 (plane on which the deflection device 208 is supported by the mounting portion 238) with respect to a plane formed of the accurate seat surfaces (mounting seat surfaces) 239, 240, and 241 (plane on which the mounting portion 238 is supported by the optical box 85). In the first embodiment, the mounting seat surfaces 225 and 226 to which the high-speed deflection device 208 is mounted to the mounting portion 238 have a span shorter than that of the mounting seat surfaces to which the low-speed deflection device 201 is mounted. Therefore, the sensitivity with respect to the shaft inclination of the motor is increased. However, the mounting portion 238 can be increased in accuracy by the secondary processing, and hence the influence to the shaft inclination can be minimized. When a satisfactory result cannot be obtained only with the accuracy increased by the secondary processing, the span between the fixing holes 210 and 211 of the high-speed deflection device 208 may be increased to be equivalent with the span between the fixing holes of the low-speed deflection device 201.

[Positional Relationship of Mounting Seat Surfaces of Low-speed Deflection Device and High-speed Deflection Devices]

Figure 13:
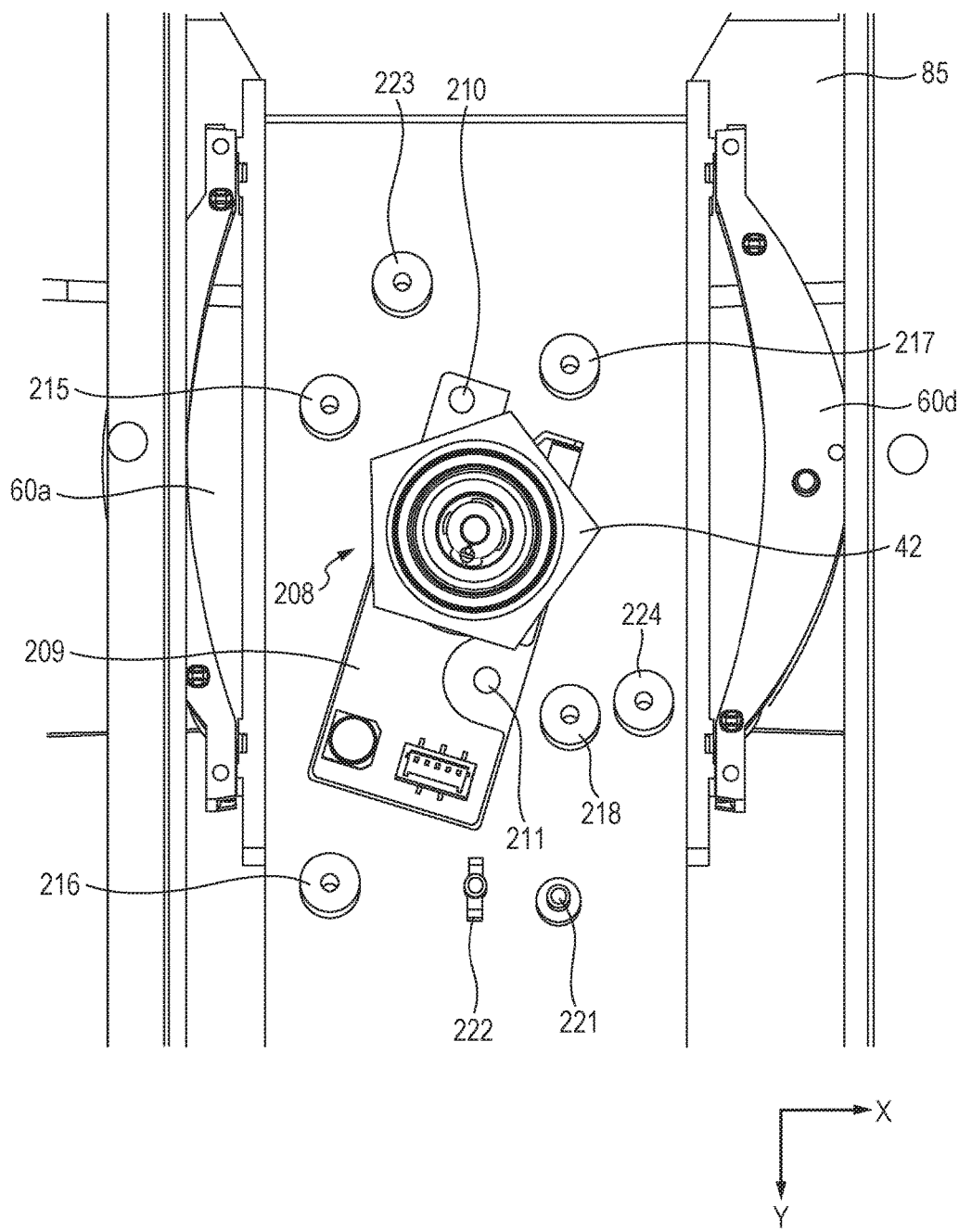
FIG. 13 is a perspective view for illustrating a relationship of positions at which the high-speed deflection device in the first embodiment is mounted.

Subsequently, the positional relationship of the mounting seat surfaces used when the high-speed deflection device 208 and the low-speed deflection device 201 are positioned is described with reference to FIG. 13. FIG. 13 is an imaginary perspective view for illustrating a state of the deflection device 208 when the mounting portion 238 is not illustrated in a case where the high-speed deflection unit 243 is arranged in the optical box 85. As illustrated in FIG. 8A and FIG. 8B, the drive board 209 of the high-speed deflection device 208 is mounted to the mounting seat surfaces 225 and 226 of the mounting portion 238 with the screws 227 and 228 through the fixing holes 210 and 211. In FIG. 13, the mounting seat surfaces 225 and 226 of the mounting portion 238, which serve as third seat surfaces and have the drive board 209 of the high-speed deflection device 208 mounted thereon, are arranged without overlapping with the mounting seat surfaces 215 to 218 for the low-speed deflection device 201. In this way, the mounting seat surfaces are prevented from overlapping with each other. In this manner, the mounting seat surfaces 225 and 226 for the deflection device 208 and further the screw-receiving shape portions 276 and 277 (FIG. 9) formed on the back sides of the mounting seat surfaces 225 and 226 do not interfere with the mounting seat surfaces for the low-speed deflection device 201 of the optical box 85. As a result, there is an advantage in that the degree of freedom in design layout is increased.

[Noise Insulation by Mounting Portion]

Figure 14A:
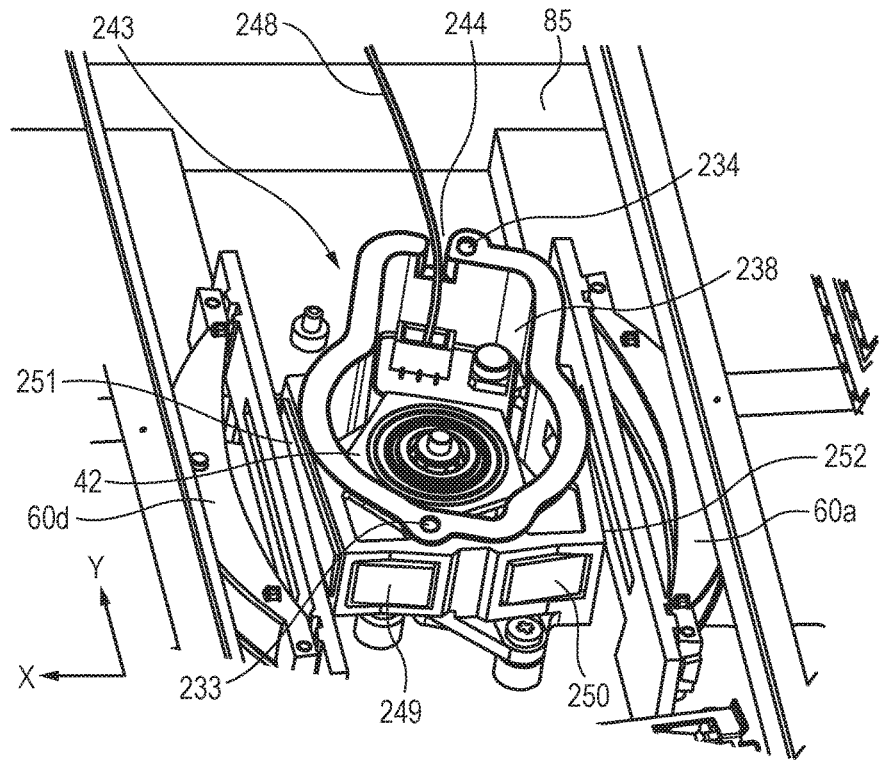
FIG. 14A illustrates an outer appearance of the mounting portion in the first embodiment.
Figure 14B:
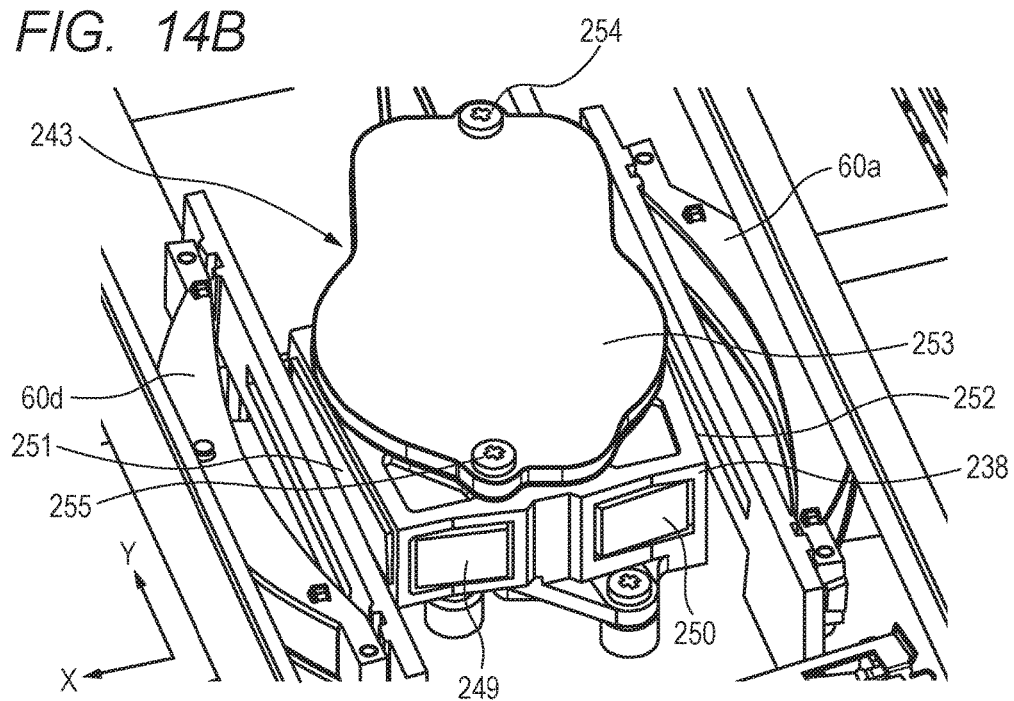
FIG. 14B illustrates the outer appearance of the mounting portion in the first embodiment.

FIG. 14A and FIG. 14B are perspective views for illustrating a region around the high-speed deflection unit 243, which are obtained when the perspective view of FIG. 12 is viewed from the deep side of FIG. 12 in the front direction. In FIG. 14A, the mounting portion 238 may have a planar shape when the mounting portion 238 is used only for positioning of the deflection device 208. However, depending on the number of revolutions of the deflection device 208 in which the motor rotates at high speed, vibration due to rotation of the motor may be propagated to the optical box 85 to cause scanning-line runout due to large noise and vibration. In the first embodiment, the mounting portion 238 has a configuration for tightly sealing the deflection device 208 to reduce the influence of noise and vibration of the motor. Therefore, the mounting portion 238 does not have a planar shape, but has a vertical wall surface at an outer peripheral portion thereof. The light beam emitted from the light source is radiated to the rotary polygon mirror 42 of the deflection device 208, and the rotary polygon mirror 42 reflects the light beam to scan the light beam on the photosensitive drum. Therefore, a transmission member capable of tightly sealing the deflection device 208 is required in the vertical wall surface of the mounting portion 238. In view of this, the mounting portion 238 has a function of tightly sealing the deflection device 208 by supporting, through bonding, sealing glasses 249 and 250 through which the light beam emitted from the light source enters and sealing glasses 251 and 252 from which the light beam deflected by the rotary polygon mirror 42 exits, and a function of transmitting the light beam. In the first embodiment, the motor mounted to the mounting portion 238 is not limited to the motor included in the high-speed deflection device 208. However, assuming that the mounting portion 238 is a high-strength structure made of a metal, it is reasonable to support the high-speed deflection device 208 by the mounting portion 238 also in terms of attenuation of vibration and noise of the motor.

FIG. 14B is a perspective view for illustrating a state in which the cover 253 is mounted to the upper portion of the mounting portion 238 illustrated in FIG. 14A, and the cover 253 is fastened to screw holes 234 and 233 of the mounting portion 238 with screws 254 and 255. In this manner, the high-speed deflection device 208 is tightly sealed by the mounting portion 238 including the sealing glasses 249 to 252 and the cover 253. In this manner, the influence of the vibration and the noise caused by the motor can be reduced. When, for example, a urethane elastic member is sandwiched between abutment surfaces of the mounting portion 238 and the cover 253, the sealing degree is further increased. An elastic member made of a similar material may be fitted to the opening 244 for the wire bundle, which is formed in the mounting portion 238.

As described above, according to the first embodiment, the deflection devices having the different specifications can be positioned to the common optical box without reducing the shaft inclination accuracy.

[Second Embodiment]

In the first embodiment, the mounting seat surfaces of the optical box 85 to which the high-speed deflection unit 243 is mounted are set to have the same height. In a second embodiment of the present invention, description is made of an optical box in which the mounting seat surfaces of the optical box 85 to which the high-speed deflection unit 243 is mounted have different heights.

[Configurations of Mounting Seat Surfaces of Optical Box to which Deflection Unit is Mounted]

Figure 15:
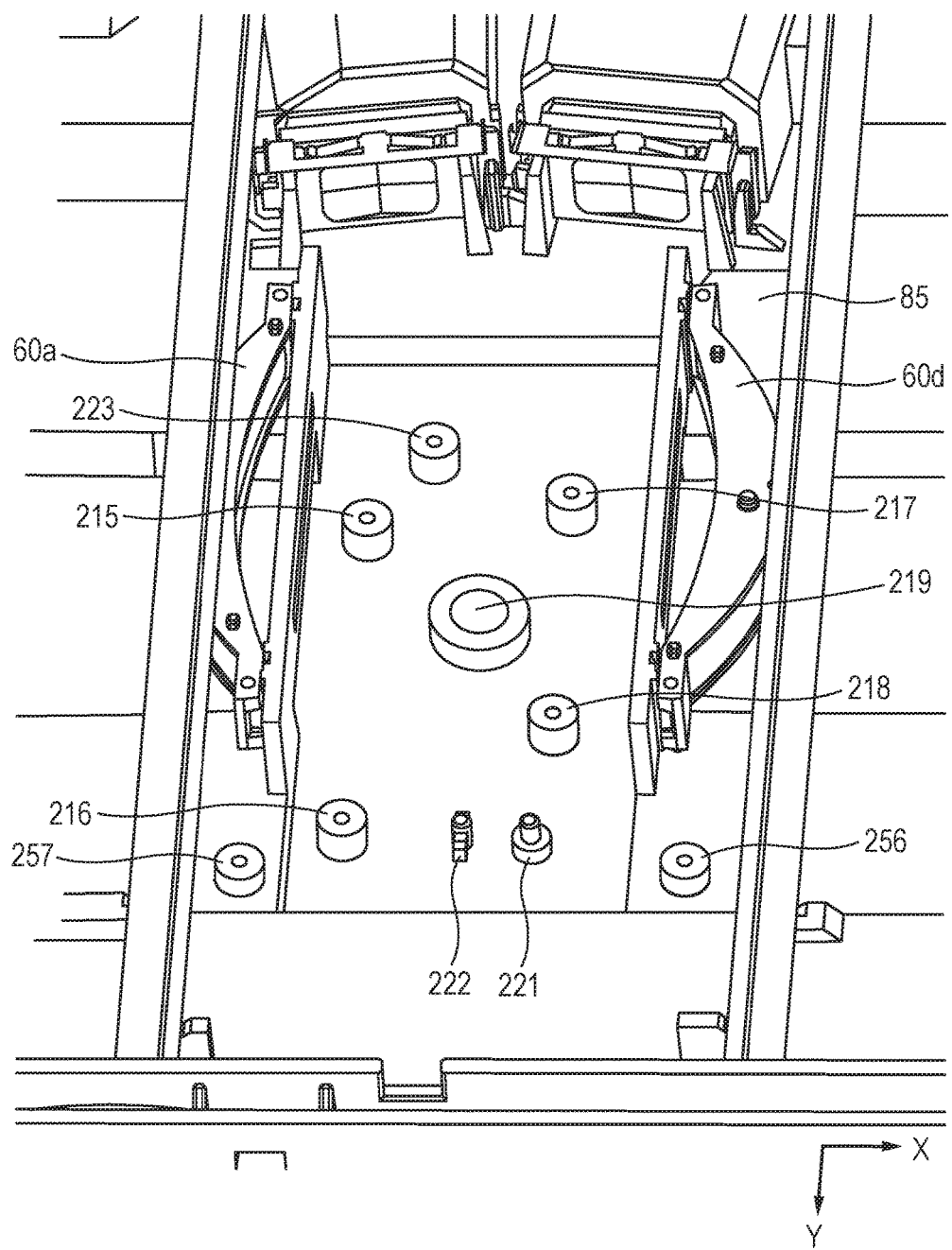
FIG. 15 is a perspective view for illustrating mounting seat surfaces of an optical box of the second embodiment.
Figure 16:
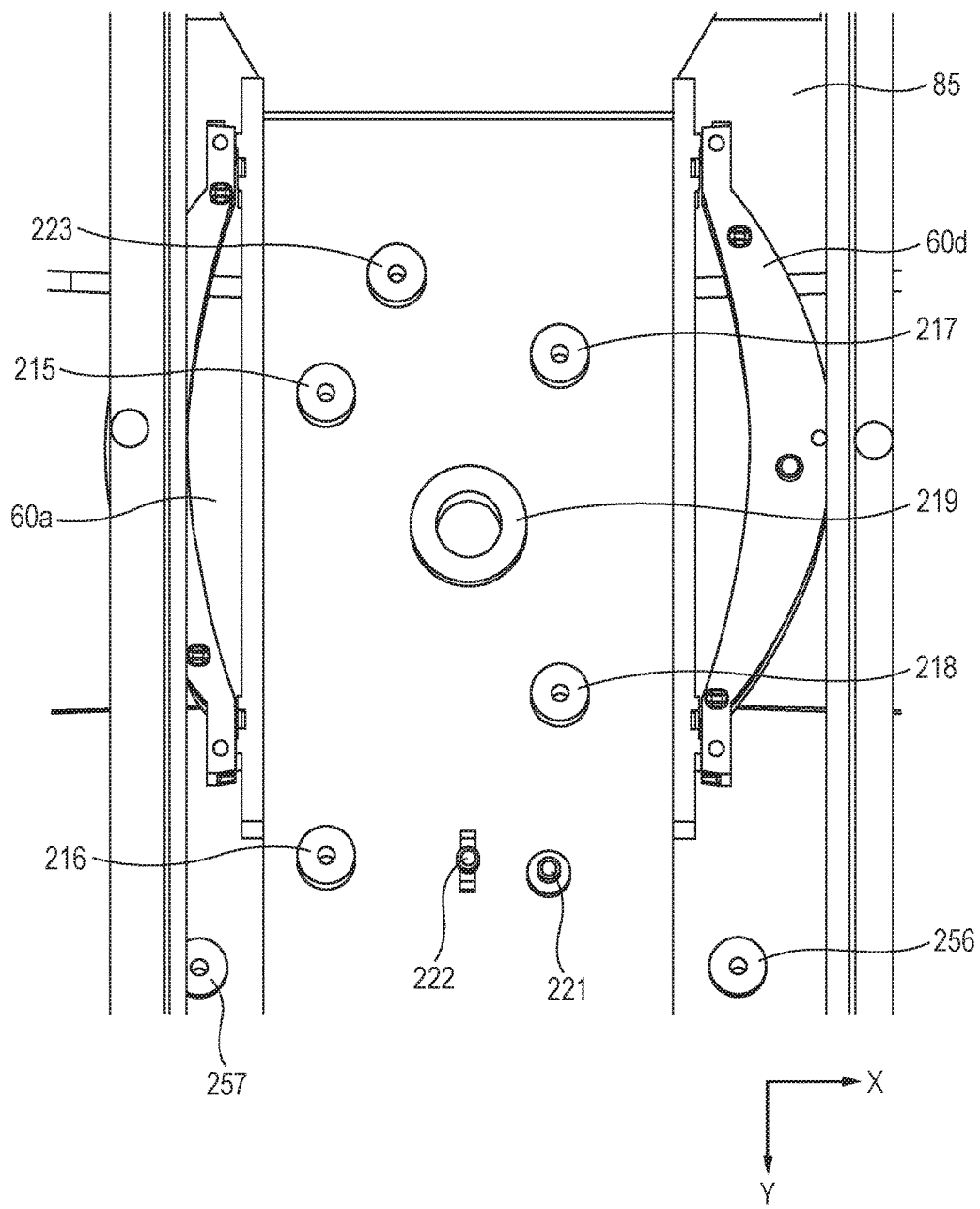
FIG. 16 is a perspective view for illustrating the mounting seat surfaces of the optical box of the second embodiment.

FIG. 15 is a perspective view for illustrating the bottom surface of the optical box 85 which is used in the second embodiment and has the mounting seat surfaces to which the high-speed deflection unit 243 is mounted. FIG. 16 is a perspective view of the mounting seat surfaces illustrated in FIG. 15 as viewed from above. It is understood from FIG. 15 and FIG. 16 that mounting seat surfaces 256 and 257 are added to the mounting seat surfaces formed on the optical box 85 in the first embodiment illustrated in FIG. 10. The mounting seat surfaces (also referred to as "supporting seat surfaces") for the high-speed deflection unit 243 of the optical box 85 in the second embodiment are the three mounting seat surfaces 223, 256, and 257. As compared to the first embodiment, the support span in an X direction of FIG. 15 is increased by forming the mounting seat surfaces 256 and 257. As described above, the high-speed deflection device 208 is mounted to the mounting portion 238, and thus the high-speed deflection device 208 is mounted (fixed) to the optical box 85 through intermediation of the mounting portion 238 and a seat surface expansion portion 258 (see FIG. 17). In this manner, the support span can be extended depending on the necessary shaft inclination accuracy.

As illustrated in FIG. 15, unlike the first embodiment, the heights of the mounting seat surfaces are not the same. The heights (positions) of the mounting seat surfaces 256 and 257 from the bottom surface of the optical box 85 are higher by one step with respect to the mounting seat surface 223. That is, the mounting portion 238 of the second embodiment is not required to have a planar shape unlike the first embodiment, and hence can be mounted to mounting seat surfaces having different heights (having a step difference). With use of the mounting portion 238 as described above, the supporting seat surfaces for the high-speed deflection unit 243 can be formed at any positions that can ensure the accuracy of the optical box 85, and the degree of freedom in design can be increased.

Figure 17:
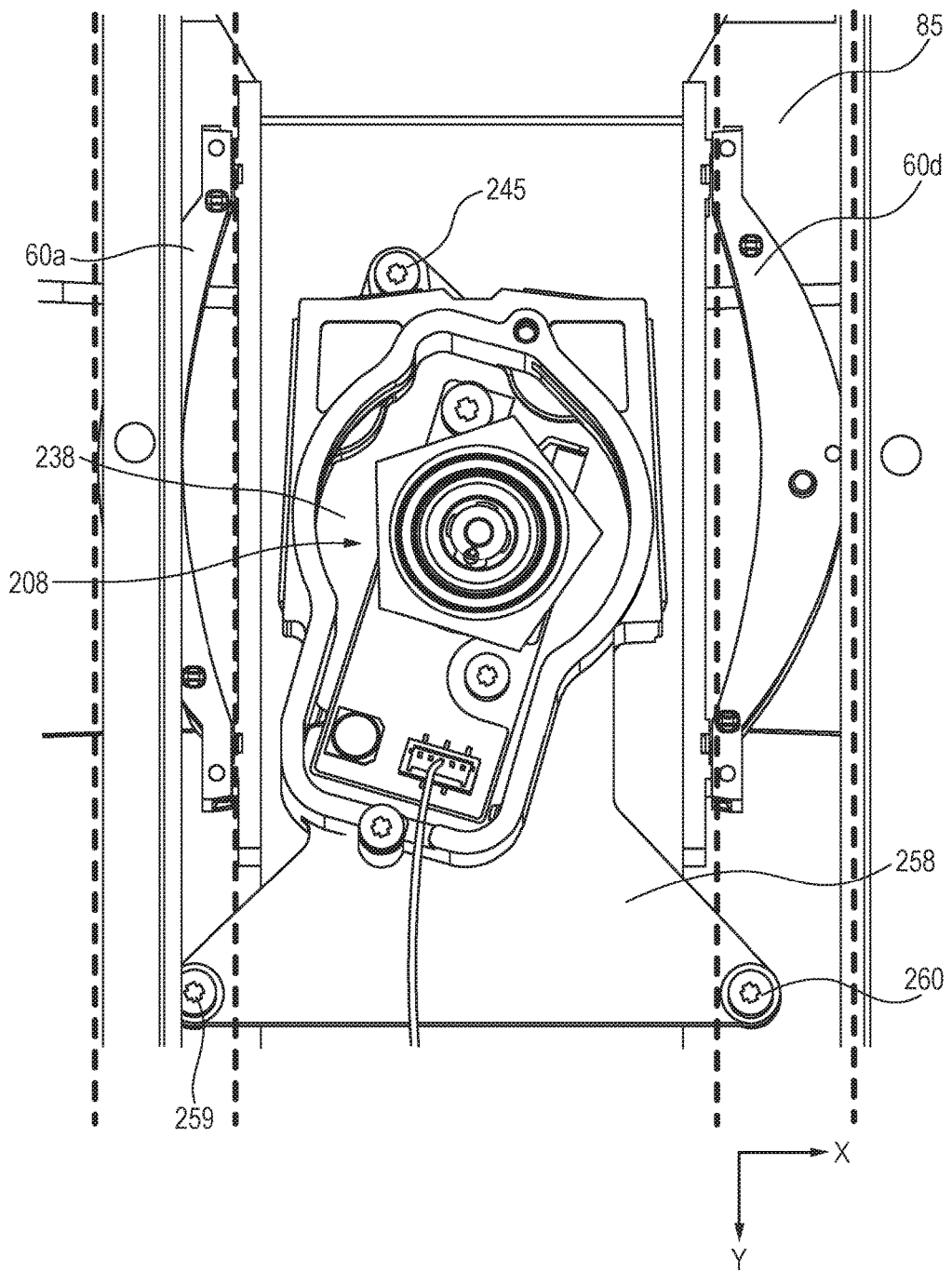
FIG. 17 is a perspective view for illustrating a state in which a high-speed deflection unit is mounted to the optical box of the second embodiment.

FIG. 17 is a perspective view for illustrating a state in which the high-speed deflection unit 243 in which the high-speed deflection device 208 is mounted to the mounting portion 238 is supported by the mounting seat surfaces 223, 256, and 257 serving as supporting seat surfaces of the optical box 85. In FIG. 17, the mounting portion 238 includes the seat surface expansion portion 258. The mounting portion 238 is fastened to the mounting seat surface 223 of the optical box 85 with a screw 245, fastened to the mounting seat surface 256 with a screw 260, and fastened to the mounting seat surface 257 with a screw 259, to thereby be fixed to the optical box 85. The mounting seat surfaces 256 and 257 are formed at positions that are higher than the mounting seat surface 223. Therefore, the back surface of the seat surface expansion portion 258 (surface corresponding to the optical box 85) is not in contact with the mounting seat surface 216 or the rotation regulation bosses 221 and 222.

In a general light scanning apparatus, a shaft inclination direction in which the accuracy of the shaft inclination amount of the rotary polygon mirror 42 is desired to be increased is often the X direction in FIG. 17 in which the optical lenses of the imaging optical system are arranged. Therefore, in the second embodiment, the mounting seat surfaces are formed at positions extended in directions of the imaging lenses 60a and 60d, that is, in an X-axis direction. In this manner, the mounting seat surfaces can be expanded to regions (regions surrounded by the broken lines in FIG. 17) extended in the longitudinal direction of the imaging lenses 60a and 60d, which has not been allowed in a simple configuration for supporting the drive board of the comparative example in the optical box 85.

As described above, according to the second embodiment, the deflection devices having the different specifications can be positioned to the common optical box without reducing the shaft inclination accuracy.

[Third Embodiment]

In a third embodiment of the present invention, there is described an embodiment in which elastic members are sandwiched at the mounting seat surfaces for the high-speed deflection unit 243 to adjust the shaft inclination amount.

[Adjustment of Shaft Inclination of Deflection Unit]

Figure 18:
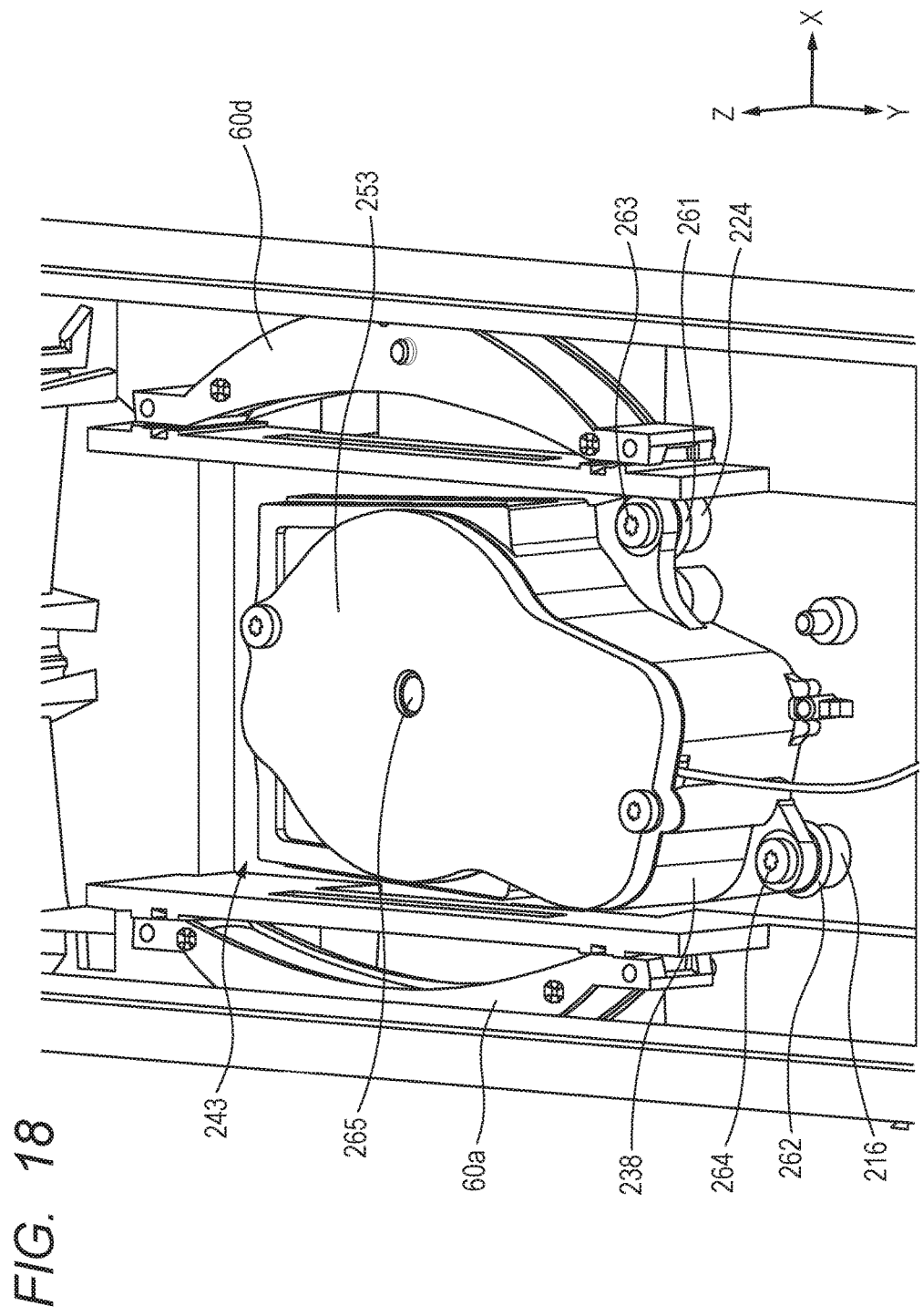
FIG. 18 is a perspective view for illustrating an outer appearance of a mounting portion in the third embodiment.

FIG. 18 is a perspective view for illustrating a state in which the high-speed deflection unit 243 in which the high-speed deflection device 208 is mounted to the mounting portion 238 is mounted to the optical box 85. In FIG. 18, the third embodiment differs from the first embodiment in that the heights of the mounting seat surfaces 216 and 224 from the bottom portion (bottom surface) of the optical box are lowered, and in that O-rings 261 and 262 are sandwiched between the mounting seat surfaces 216 and 224 and the seat surfaces 240 and 241 formed on the back surface of the mounting portion 238. When the O-rings 261 and 262 are sandwiched, the degree of fastening a screw 263 for fastening the mounting seat surface 224 and the seat surface 240 and a screw 264 for fastening the mounting seat surface 216 and the seat surface 241 can be adjusted, and thus compression amounts of the O-rings serving as elastic members are variable. In this manner, the shaft inclination amount of the high-speed deflection unit 243 can be adjusted.

To the mounting portion 238 illustrated in FIG. 18, the cover 253 serving as a cover member is mounted so as to reduce the noise caused by rotation of the rotary polygon mirror 42. The cover 253 has an opening portion 265 formed at a position corresponding to an extension line of the rotary center axis of the rotary polygon mirror 42. The opening portion 265 is formed by tapping so that the mounting portion 238 can be tightly sealed by fastening a screw. A reflection angle sensor may be used through the opening portion 265 to measure a rotational-axis top surface of the rotary polygon mirror 42. Thus, the shaft inclination amount can be detected. In this manner, the increase in shaft inclination amount due to the mounting portion 238 can be prevented.

As described above, according to the third embodiment, the deflection devices having the different specifications can be positioned to the common optical box without reducing the shaft inclination accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025994, filed Feb. 15, 2017, which is hereby incorporated by reference herein in its entirety.

What is claimed is:

1. A casing of a light scanning apparatus, the casing accommodating a rotary polygon mirror having a plurality of reflective surfaces and configured to deflect a light beam emitted from a light source, and an optical member including an imaging lens configured to image the light beam deflected by the rotary polygon mirror on a photosensitive member and a reflective mirror configured to guide the light beam deflected by the rotary polygon mirror to the photosensitive member, the casing comprising:
- a plurality of first seat surfaces arranged on a bottom surface of the casing to mount a first deflection portion to the casing, the first deflection portion including a first rotary polygon mirror, a first motor configured to drive the first rotary polygon mirror, and a first board on which the first rotary polygon mirror and the first motor are fixed; and
- a plurality of second seat surfaces arranged on the bottom surface of the casing to mount a second deflection portion to the casing, the second deflection portion including a second rotary polygon mirror, a second motor configured to drive the second rotary polygon mirror and having a maximum number of revolutions per unit time that is higher than a maximum number of revolutions per unit time of the first motor, a second board on which the second rotary polygon mirror and the second motor are fixed, and a mounting portion configured to support the second board,
- wherein at least one of the plurality of second seat surfaces is arranged outside of a region formed by connecting the plurality of first seat surfaces to each other,
- wherein the second deflection portion includes a cover member to be mounted to the mounting portion,
- wherein the second rotary polygon mirror, the second motor, and the second board are tightly sealed inside the mounting portion by the cover being mounted to the mounting portion, and
- wherein the cover member has an opening on an extension line of a rotary center axis of the rotary polygon mirror.

2. A casing of a light scanning apparatus according to claim 1,
- wherein the mounting portion has a plurality of third seat surfaces to support the second board, and
- wherein the plurality of third seat surfaces is arranged so that a position of each of the plurality of third seat surfaces corresponding to the bottom surface of the casing is prevented from overlapping with each of the plurality of first seat surfaces when the second deflection portion is mounted to the casing.

3. A casing of a light scanning apparatus according to claim 2, wherein a height from a surface of the first board opposing to the casing to the first rotary polygon mirror is larger than a height from a surface of the second board opposing to the mounting portion to the second rotary polygon mirror.

4. A casing of a light scanning apparatus according to claim 1, further comprising an elastic member between the second deflection portion and each of the plurality of second seat surfaces,
- wherein a shaft inclination amount of the second rotary polygon mirror is adjusted by changing a compression amount of the elastic member with use of a screw fastening the second deflection portion and each of the plurality of second seat surfaces.

5. A casing of a light scanning apparatus according to claim 1, wherein the plurality of second seat surfaces has a same height from the bottom surface of the casing.

6. A casing of a light scanning apparatus according to claim 5, wherein one of the plurality of first seat surfaces also serves as one of the plurality of second seat surfaces.

7. A casing of a light scanning apparatus according to claim 1, wherein the plurality of second seat surfaces includes a seat surface having a different height from the bottom surface of the casing.

8. A casing of a light scanning apparatus according to claim 7, wherein the plurality of second seat surfaces includes a plurality of seat surfaces arranged in an extended region in a longitudinal direction of the imaging lens.

9. A light scanning apparatus, comprising a casing accommodating a rotary polygon mirror having a plurality of reflective surfaces and configured to deflect a light beam emitted from a light source, and an optical member including an imaging lens configured to image the light beam deflected by the rotary polygon mirror on a photosensitive member and a reflective mirror configured to guide the light beam deflected by the rotary polygon mirror to the photosensitive member,
the casing including:
- a plurality of first seat surfaces arranged on a bottom surface of the casing to mount a first deflection portion to the casing, the first deflection portion including a first rotary polygon mirror, a first motor configured to drive the first rotary polygon mirror, and a first board on which the first rotary polygon mirror and the first motor are fixed; and
- a plurality of second seat surfaces arranged on the bottom surface of the casing to mount a second deflection portion to the casing, the second deflection portion including a second rotary polygon mirror, a second motor configured to drive the second rotary polygon mirror and having a maximum number of revolutions per unit time that is higher than a maximum number of revolutions per unit time of the first motor, a second board on which the second rotary polygon mirror and the second motor are fixed, and a mounting portion configured to support the second board,
- wherein at least one of the plurality of second seat surfaces is arranged outside of a region formed by connecting the plurality of first seat surfaces to each other,
- wherein the second deflection portion includes a cover member to be mounted to the mounting portion,
- wherein the second rotary polygon mirror, the second motor, and the second board are tightly sealed inside the mounting portion by the cover being mounted to the mounting portion, and
- wherein the cover member has an opening on an extension line of a rotary center axis of the rotary polygon mirror.

10. An image forming apparatus, comprising:
- an image forming unit configured to form an image on a recording material; and
- a light scanning apparatus including a casing accommodating a rotary polygon mirror having a plurality of reflective surfaces and configured to deflect a light beam emitted from a light source, and an optical member including an imaging lens configured to image the light beam deflected by the rotary polygon mirror on a photosensitive member and a reflective mirror configured to guide the light beam deflected by the rotary polygon mirror to the photosensitive member,
the casing including:
- a plurality of first seat surfaces arranged on a bottom surface of the casing to mount a first deflection portion to the casing, the first deflection portion including a first rotary polygon mirror, a first motor configured to drive the first rotary polygon mirror, and a first board on which the first rotary polygon mirror and the first motor are fixed; and a plurality of second seat surfaces arranged on the bottom surface of the casing to mount a second deflection portion to the casing, the second deflection portion including a second rotary polygon mirror, a second motor configured to drive the second rotary polygon mirror and having a maximum number of revolutions per unit time that is higher than a maximum number of revolutions per unit time of the first motor, a second board on which the second rotary polygon mirror and the second motor are fixed, and a mounting portion configured to support the second board, wherein at least one of the plurality of second seat surfaces is arranged outside of a region formed by connecting the plurality of first seat surfaces to each other, wherein the second deflection portion includes a cover member to be mounted to the mounting portion, wherein the second rotary polygon mirror, the second motor, and the second board are tightly sealed inside the mounting portion by the cover being mounted to the mounting portion, and wherein the cover member has an opening on an extension line of a rotary center axis of the rotary polygon mirror.

* * * * *